(12) United States Patent      (10) Patent No.: US 12,199,704 B2
Hancharik et al.      (45) Date of Patent: Jan. 14, 2025

(54) SPARSE ANTENNA ARRAY CALIBRATION

(71) Applicant: Viasat, Inc., Carlsbad, CA (US)

(72) Inventors: David J Hancharik, Norcross, GA (US); Parker A Robinson, Ocala, FL (US); Peter S. Wyckoff, Scottsdale, AZ (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/265,668

(22) PCT Filed: Jan. 4, 2022

(86) PCT No.: PCT/US2022/011111
§ 371 (c)(1),
(2) Date: Jun. 6, 2023

(87) PCT Pub. No.: WO2022/150292
PCT Pub. Date: Jul. 14, 2022

(65) Prior Publication Data
US 2024/0048189 A1    Feb. 8, 2024

Related U.S. Application Data

(60) Provisional application No. 63/134,575, filed on Jan. 6, 2021.

(51) Int. Cl.
*H04B 7/0413*     (2017.01)
*H04B 7/024*     (2017.01)
(Continued)

(52) U.S. Cl.
CPC ........... *H04B 7/0413* (2013.01); *H04B 7/024* (2013.01); *H04B 7/0617* (2013.01); *H04B 7/0684* (2013.01); *H04W 72/0453* (2013.01)

(58) Field of Classification Search
CPC .... H04B 7/0413; H04B 7/024; H04B 7/0617; H04B 7/0684; H04W 72/0453; H04W 16/18; H04W 84/06; G01S 19/14
See application file for complete search history.

(56) References Cited

U.S. PATENT DOCUMENTS 9,948,407 B2 * 4/2018 Tang ................... H04B 7/0617
9,948,408 B1 * 4/2018 Gomadam ............ H01Q 3/267
(Continued)

FOREIGN PATENT DOCUMENTS

CN      105790812 A    7/2016
EP      1098390 A2    5/2001

OTHER PUBLICATIONS

International Search Report and Written Opinion, PCT/US2022/011111, dated Jun. 2, 2022, 13 pages.

*Primary Examiner* — Jean B Corrielus
(74) *Attorney, Agent, or Firm* — Holland & Hart LLP

(57) ABSTRACT

A system for communications may include an antenna array, where an inter-element spacing of antennas of the antenna array may be different across the antenna array; antenna managers that are coupled with respective antennas and configured to transmit and receive ranging signals used to measure parameters representative of distances between a respective antenna and the other antennas; a calibration unit that determines positions of the antennas based on the measured parameters and positions of reference antennas; and a communications manager that communicates with a terminal according to beam coefficients determined for the antenna array based on the determined positions of the antennas.

25 Claims, 7 Drawing Sheets

(51) Int. Cl.
*H04B 7/06* (2006.01)
*H04W 72/0453* (2023.01)

(56) References Cited

U.S. PATENT DOCUMENTS

| | | |
|---|---|---|
| 11,322,838 B1* | 5/2022 | Ramachandran ...... H01Q 3/267 |
| 2013/0070677 A1 | 3/2013 | Chang et al. |
| 2014/0232596 A1* | 8/2014 | Apker ..................... G01S 19/23 |
| | | 342/357.62 |
| 2015/0222336 A1* | 8/2015 | Yilmaz .................. H04B 17/21 |
| | | 370/252 |
| 2016/0127027 A1 | 5/2016 | Ling et al. |
| 2017/0070247 A1* | 3/2017 | Hageman .............. H04W 72/20 |
| 2019/0178983 A1 | 6/2019 | Lin et al. |

\* cited by examiner

SPARSE ANTENNA ARRAY CALIBRATION

CROSS REFERENCE

The present application is a 371 national phase filing of International Patent Application No. PCT/US2022/011111 by Hancharik et al. entitled, "SPARSE ANTENNA ARRAY CALIBRATION", filed Jan. 4, 2022 and to U.S. Provisional Patent Application No. 63/134,575 by Hancharik et al., entitled "POWER EFFICIENT, IMPLEMENTATION EFFICIENT, CALIBRATION SCHEMES FOR LSNHRCA" filed Jan. 6, 2021, each of which is assigned to the assignee hereof and each of which is hereby incorporated by reference in its entirety.

BACKGROUND

The following relates generally to electronic communications, including sparse antenna array calibration.

Communications devices may communicate with one another using wired connections, wireless (e.g., radio frequency (RF)) connections, or both. Wireless communications between communications devices may be performed using wireless spectrum that has been designated for a service provider, wireless technology, or both. In some examples, the amount of information that can be communicated via a wireless communications network is based on an amount of wireless spectrum designated to the service provider, and an amount of frequency reuse within the region in which service is provided. Wireless communications (e.g., cellular communications, satellite communications, etc.) may use beamforming and multiple-input multiple-output (MIMO) techniques for communications between devices to increase frequency reuse. However, providing a high level of frequency reuse in some types of communication systems, such as satellite communications, presents challenges.

SUMMARY

A system for communications may include an antenna array, where an inter-element spacing of antennas of the antenna array may be different across the antenna array. The system may also include antenna managers that are coupled with respective antennas and configured to transmit and receive ranging signals used to measure parameters representative of distances between a respective antenna and the other antennas. The system may also include a calibration unit that determines positions of the antennas based on the measured parameters and positions of reference antennas. The system may also include a communications manager that communicates with a terminal according to beam coefficients determined for the antenna array based on the determined positions of the antennas.

DETAILED DESCRIPTION

Figure 1:
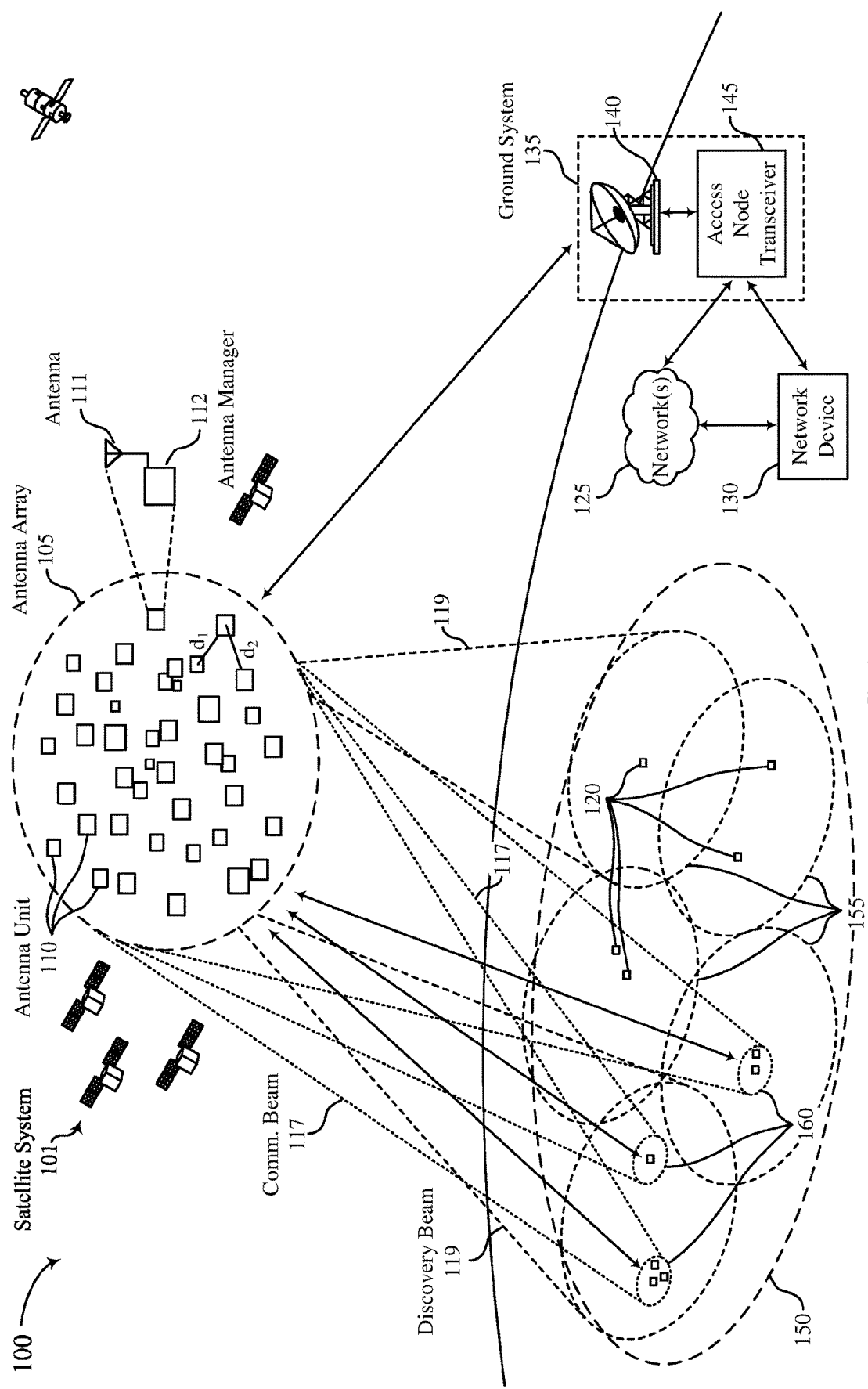
FIG. 1 shows an example of a satellite communications system that supports sparse antenna array calibration in accordance with examples described herein.

A communications system (e.g., a satellite system) may include devices (e.g., satellites) equipped with multiple antennas. The communications system may use the devices to support concurrent communications by multiple terminals. In some examples, the communications system may use the devices to support beamformed communications. Beamformed communications may be used to increase a utilization of communication resources—e.g., by enabling wireless spectrum to be reused in different regions of a geographic area. In some examples, beamforming techniques may use the multi-antenna devices to form a set of spot beams that cover a geographic area (e.g., in an at least partially overlapping pattern).

Although beamforming techniques may be used to increase spectrum utilization, the resolution of beamforming techniques may be limited—e.g., based on a size of an antenna array. In some examples, the coverage areas of the spot beams are based on a size of an antenna array of the satellite system, a frequency used by the satellite system, or an orbit used by the satellite system (e.g., a geosynchronous earth orbit). For a typical satellite payload (e.g., an array fed reflector, where the reflector spans 10 to 30 meters) coverage areas of spot beams formed by a satellite system on the surface of the Earth may be relatively large (e.g., hundreds or thousands of kilometers in diameter). Thus, the use of current beamforming techniques to increase a reuse of frequency resources (e.g., by using smaller spot beams) may be limited.

To increase a resolution of beamforming and support an increased quantity of users within a geographic area, techniques described herein may use a large, sparse antenna array having antennas with inter-element spacing that is different across the antenna array. Current antenna arrays may be rigid and have consistent inter-element spacing, and thus, developing large antenna arrays using current techniques may be infeasible. In some examples, the large, sparse antenna array may span a large distance (e.g., greater than a kilometer) based on using flexible antenna arrays. In some cases, spacing between antennas of the flexible antenna arrays may be not rigidly set and thus the antenna arrays may have different inter-element spacing. In some cases, the inter-element spacing may change over time (e.g., due to drift of antennas relative to each other). In some cases, the antennas of a large, sparse antenna array may be grouped into sets of antennas (e.g., antenna subarrays), where each set of antennas may be used to form a beam (e.g., a discovery beam). Also, the antennas of multiple sets of the large, sparse antenna array may be used to form one or more beams (e.g., one or more communication beams).

The large, sparse antenna array may be used (e.g., in combination with respective beam coefficients) to form beams within a geographic area using geometric interpretation. In such cases, the beam coefficients may be selected based on positions of the antennas of the sparse antenna array relative to a geographic area. In some examples, prior to determining the positions of the antennas of the sparse antenna array relative to the geographic area, the positions of the antennas themselves may be determined. In some examples, antenna managers may be coupled with respective antennas of a large, sparse antenna array. The antenna managers may be configured to transmit (e.g., via respective antennas) and receive (e.g., via respective antennas) ranging signals. The ranging signals may be used (e.g., by the antenna managers) to measure parameters representative of distances between a respective antenna and the other antennas. The positions of the antennas may be determined (e.g., by a calibration unit) based on the measured parameters and positions of reference antennas. Based on determining the positions of the antennas, the sparse antenna array may be used to communicate (e.g., in combination with a communications manager) with a terminal according to beam coefficients determined for the antenna array using the determined positions of the antennas.

FIG. 1 shows an example of a satellite communications system 100 that supports sparse antenna array calibration in accordance with examples described herein. Satellite communications system 100 may include a ground system 135, terminals 120, and satellite system 101.

The ground system 135 may include a network of access nodes 140 that are configured to communicate with the satellite system 101. The access nodes 140 may be coupled with access node transceivers 145 that are configured to process signals received from and to be transmitted through corresponding access node(s) 140. The access node transceivers 145 may also be configured to interface with a network 125 (e.g., the Internet) e.g., via a network device 130 (e.g., a network operations center, satellite and gateway terminal command centers, or other central processing centers or devices) that may provide an interface for communicating with the network 125.

Terminals 120 may include various devices configured to communicate signals with the satellite system 101, which may include fixed terminals (e.g., ground-based stationary terminals) or mobile terminals such as terminals on boats, aircraft, ground-based vehicles, and the like. A terminal 120 may communicate data and information with an access node 140 via the satellite system 101. The data and information may be communicated with a destination device such as a network device 130, or some other device or distributed server associated with a network 125.

The satellite system 101 may include a single satellite, or a network of satellites that are deployed in space orbits (e.g., low earth orbits, medium earth orbits, geostationary orbits, etc.). One or more satellites included in satellite system 101 may be equipped with multiple antennas (e.g., one or more antenna arrays). In some examples, the one or more satellites equipped with multiple antennas may each include one or more antenna panels that include an array of evenly distributed antennas (which may also be referred to as antenna elements). In some examples, a satellite may be equipped with an antenna array including antennas that are unevenly distributed across a large region. In some examples, the antennas may be connected to a central entity via wired or wireless links. Deploying the antennas over the large region may increase an aperture size of the antenna array of the satellite relative to an antenna array that includes evenly distributed antennas (e.g., due to limitations associated with manufacturing and deploying a large antenna array with evenly distributed antennas). In some examples, a set of satellites, each including an antenna, are unevenly distributed across the large region, where each satellite may communicate with a central entity (e.g., a central server or ground station). In such cases, the antennas of the set of satellites may be used to form an antenna array. In some examples, a set of satellites, each including an antenna subarray, are unevenly distributed across the large region, where each satellite may communicate with a central entity (e.g., a central server or ground station) and where the antenna subarrays may include an array of evenly distributed antennas. In such cases, the antenna subarrays of the set of satellites may be used to form an antenna array.

The satellite system 101 may use the one or more satellites to support multiple-input multiple-output (MIMO) techniques to increase a utilization of frequency resources used for communications—e.g., by enabling wireless spectrum to be reused, in time and frequency, in different geographic regions of a geographic area. Similarly, the satellite system 101 may use the one or more satellites to support beamforming techniques to increase a utilization of frequency resources used for communications.

MIMO techniques may be used to exploit multipath signal propagation and increase spectral efficiency by transmitting or receiving multiple signals via different spatial layers. The multiple signals may, for example, be transmitted by a transmitting device (e.g., a satellite system) via a set of antennas in accordance with a set of weighting coefficients. Likewise, the multiple signals may be received by a receiving device (e.g., a satellite system) via a set of antennas in accordance with a set of weighting coefficients. Each of the multiple signals may be associated with a separate spatial stream and may carry bits associated with the same data stream (e.g., the same codeword) or different data streams (e.g., different codewords). MIMO techniques include single-user MIMO (SU-MIMO), where multiple spatial layers are used to communicate with one device, and multiple-user MIMO (MU-MIMO), where multiple spatial layers are used to communicate with multiple devices.

To determine weighting coefficients to apply to the set of antennas such that the N spatial layers are formed, an (M×N) MIMO matrix may be formed, where M may represent the quantity of antennas of the set of antennas. In some examples, M may be equal to N. The MIMO matrix may be determined based on a channel matrix and used to isolate the different spatial layers of the channel. In some examples, the weighting coefficients are selected to emphasize signals transmitted using the different spatial layers while reducing interference of signals transmitted in the other spatial layers. Accordingly, processing signals received at each antenna with the set of antennas (e.g., a signal received at the set of antennas) using the MIMO matrix may result in multiple signals being output, where each of the multiple signals may correspond to one of the spatial layers. The elements of the MIMO matrix used to form the spatial layers of the channel may be determined based on channel sounding probes received at a satellite system 101—e.g., from one or more devices. In some examples, the weighting coefficients used for MIMO communications may be referred to as beam coefficients, and the multiple signals or spatial layers may be referred to as beam signals.

Beamforming techniques may be used to shape or steer a communication beam along a spatial path between a satellite system 101 and a geographic area. A communication beam may be formed by determining weighting coefficients for antenna elements of antenna array that result in the signals transmitted from or received at the antenna elements being combined such that signals propagating in a particular orientation with respect to an antenna array experience constructive interference while others experience destructive interference. Thus, beamforming may be used to transmit signals having energy that is focused in a direction of a communication beam and to receive signals that arrive in a direction of the communication with increased signal power (relative to the absence of beamforming). The weighting coefficients may be used to apply amplitude offsets, phase offsets, or both to signals carried via the antennas. In some examples, the weighting coefficients applied to the antennas may be used to form multiple beams associated with multiple directions, where the multiple beams may be used to communicate multiple signals having the same frequency at the same time. The weighting coefficients used for beamforming may be referred to as beam coefficients, and the multiple signals may be referred to as beam signals.

In some examples, beamforming techniques may be used by a satellite system 101 to form spot beams that are tiled (e.g., tessellated) across a geographic area. In some examples, the wireless spectrum used by a satellite system 101 may be reused across sets of the spot beams for communications between terminals 120 and the satellite system. In some examples, the wireless spectrum can be reused in spot beams that do not overlap, where a contiguous geographic region can be covered by overlapping spot beams that each use orthogonal resources (e.g., orthogonal time, frequency, or polarization resources).

To support an increased quantity of users within a geographic area, an antenna array (which may be referred to as a large, sparse antenna array) having antennas with inter-element spacing that is different across the antenna array may be used to increase a resolution of beamforming techniques. That is, the large, sparse antenna array may be used (e.g., in combination with respective beam coefficients) to form communication beams with small coverage areas (e.g., less than 10 kilometers in diameter). A large, sparse antenna array, such as antenna array 105, may include multiple antenna units 110 (e.g., hundreds or thousands of antennas) that are unevenly distributed across an area—e.g., in space. In some examples, each antenna unit 110 is, or is installed on, an individual satellite. In other examples, the antenna units 110 are installed on a single satellite, where each antenna unit 110 is tethered to a central location—e.g., via a physical connection.

Additionally, the distance between the antenna units 110 may be greater than a distance associated with a wavelength of signals supported for communication by the large, sparse antenna array—e.g., the distance between the antenna units 110 may be greater than a distance associated with the wavelength. In some examples, the distance between the antenna units 110 may be greater than ten times the wavelength. In some examples, a first distance ($d_1$) between a first antenna unit of the antenna units 110 and a second antenna unit of the antenna units 110 may be different than a second distance ($d_2$) between the second antenna unit and a third antenna unit of the antenna units 110, and so on throughout antenna array 105.

In some examples, a large, sparse antenna array includes multiple antenna subarrays (e.g., tens or hundreds of antenna subarrays) that are unevenly distributed across the area. In some examples, the antenna subarrays may each include a group of the antenna units 110. In some examples, the antenna subarrays may include a single antenna unit 110, where the antenna unit may be coupled with an antenna panel that includes a set of antenna elements that are evenly distributed across a corresponding antenna subarray. In some examples, in addition to being large and sparse, the antenna array 105 may be random or semi-random such that the distances between the antenna units 110 of the antenna array 105 may be uncontrolled or partially controlled (e.g., unconstrained in one or more dimensions, or allowed to drift in one or more dimensions relative to other antenna units 110).

To form the small communication beams, geometric relationships between a geographic region and the antenna units 110 of the large, sparse antenna array 105 may be used. In some examples, the geometric relationships between a geographic region and the antenna units 110 of the large, sparse antenna array 105 may also be used to simplify the processing used for massive-MIMO techniques—e.g., based on the limited directions of signal incidence, location information known for the terminals, or any combination thereof.

In some examples, to support communicating using communication beams 117 with small coverage areas, a large, sparse antenna array 105 may be used (e.g., in combination with respective beam coefficients) to form discovery beams 119 within a geographic area 150, where each discovery beam 119 may be formed by a corresponding set of antenna units 110 of the antenna array 105 and may cover a discovery area 155 within the geographic area 150. For example, each subarray may form a discovery beam 119, and the discovery beams may be tiled across the geographic area 150. Preambles transmitted from terminals 120 within a discovery area 155 of a discovery beam 119 may be detected using the large, sparse antenna array 105 (e.g., each subarray may detect preambles transmitted from within a corresponding discovery area 155).

Based on detecting a preamble using a discovery beam 119, a presence of a terminal 120 in a discovery area 155 of the discovery beam 119 may be determined. Based on detecting the presence of the terminal 120, a set of antenna units 110 (e.g., antenna units from more than one subarray, a substantial portion of antenna units 110, a majority of antenna units 110, or all of the antenna units 110) of the antenna array 105 and corresponding beam coefficients may be selected to form a communication beam 117 (e.g., a small or narrow beam) having a beam coverage area 160 within the discovery area 155 that includes a position of the terminal 120. Subsequently, signals detected at the antenna array 105 may be processed according to the beam coefficients used to form the small communication beam 117, resulting in a beam signal for the small communication beam 117. In some examples, the beam signal may include one or more signals transmitted from one or more terminals positioned within the beam coverage area 160.

In some examples, antenna array 105 includes multiple antenna subarrays, where each antenna subarray may be used to form a discovery beam 119 associated with a corresponding discovery area 155. Preambles from a set of terminals 120 may be detected using a subset of the discovery beams 119. Based on detecting the terminals using the subset of the discovery beams 119, communication beams 117 may be formed (e.g., using geometric interpretation or MIMO-based techniques) within the corresponding discovery areas 155, where beam coverage areas 160 of the communication beams 117 may encompass the detected terminals 120. Communications may be performed between the antenna array 105 and detected terminals 120 using the communication beams 117, where at least a subset of the communication beams 117 may reuse common time, frequency, and polarization resources.

To determine beam coefficients for the antenna array 105 used to form communication beams 117 (e.g., using geometric interpretation or geometrically-informed MIMO), geometric relationships between a geographic region to be covered by the communication beams 117 and the antenna units 110 may be used. For example, the distance between an antenna unit 110 and the geographic region may be used to determine a value of a beam coefficient used to introduce a phase delay to a signal received at the antenna unit 110. The geometric relationship between the antenna unit 110 and the geographic region may also be used to determine an angle of arrival of signals at the antenna unit 110. In some examples, the angle of arrival of signals at an antenna unit 110 may be used to determine a value of a beam coefficient used to adjust a magnitude of a signal received at the antenna unit 110. In some examples, the relative positions of antenna units 110 may be used to determine the beam coefficients for the antenna units 110—e.g., the beam coefficients for other antenna units 110 may be determined relative to the beam coefficients determined for a reference antenna unit 110.

To determine the geometric relationships between antenna units 110 and a geographic region and/or between antenna units 110, the positions of each of the antenna units 110 may first be determined. For example, ground-based measurement techniques (e.g., radio detection and ranging (RADAR)) may be used to determine the position (e.g., xyz coordinates) of each the antenna units 110. Additionally, or alternatively, the antenna units 110 may broadcast their positions—e.g., to a central processing unit of the antenna array 105—to determine a distance between the antenna units 110 and a central position. In such cases, the central processing unit may also measure angles of arrival for each of the broadcast signals to use along with the determined distances to determine the positions of the broadcasting antenna units 110.

In some examples, each antenna unit 110 may transmit a ranging signal (e.g., a unique ranging signal) used to determine a distance between the transmitting antenna unit 110 and the other antenna units 110 in antenna array 105. Also, each antenna unit 110 may receive the ranging signals transmitted from the other antenna units 110. In such cases, each antenna unit 110 may include an antenna 111 and an antenna manager 112. The antenna 111 may be a single antenna or multiple antennas. In some examples, the antenna 111 may be an antenna panel that includes a set of consistently-spaced antenna elements (and may be referred to as an antenna subarray). The antenna manager 112 may be used to generate a ranging signal that is unique to a corresponding antenna unit 110. In some examples, the antenna manager 112 may generate the ranging signal to include an identifier of the corresponding antenna unit 110 (e.g., each antenna unit 110 may be assigned an index), a time stamp indicating when the ranging signal was transmitted, global positioning (GPS) coordinates, or any combination thereof. In some examples, each of the antenna units 110 is configured to transmit the ranging signals at a same time. The antenna manager 112 may also be used to receive the ranging signals transmitted from the other antenna units 110. In some examples, the antenna manager 112 is used to detect parameters associated with the received ranging signals (e.g., a time at which the ranging signals are received, an angle of arrival, an identity of the transmitting antenna unit 110, etc.).

In some examples, the antenna manger 112 may transmit the detected parameters to a central processing unit (e.g., a calibration unit), which may determine the distances between each of the antenna units 110 (or, in some examples, between each of the antennas 111 of the antenna units 110). In other examples, the antenna manager 112 may determine the distances between itself and each of the other antenna units based on the detected parameters and transmit the distances to the central processing unit. In such cases, the central processing unit may combine the received distances to determine the distances between each of the antenna units 110. In either event, after determining the distances between each of the antenna units 110, the central processing unit may use the distances to determine a position of each of the antenna units 110. In some examples, in addition to using the distances, the central processing unit uses known positions of a set of the antenna units 110 that have been designated as reference antenna units (which may also be referred to as anchor antenna units) to determine an orientation of antenna array 105. The central processing unit may use both the distances and the orientation of the antenna array 105 to determine the positions of the antenna units 110. Determining the positions of each of the antenna units 110 may be referred to as calibration.

By configuring each antenna unit 110 to transmit a ranging signal and to receive the ranging signals transmitted from the other antenna units 110 and using anchor points to determine an orientation of the antenna array 105, distances between antenna units 110 (and thus the positions of the antenna units 110) may be determined with reduced latency, increased accuracy, and with reduced complexity—e.g., relative to ground-based measurement techniques, position broadcasting techniques, etc.

Figure 2:
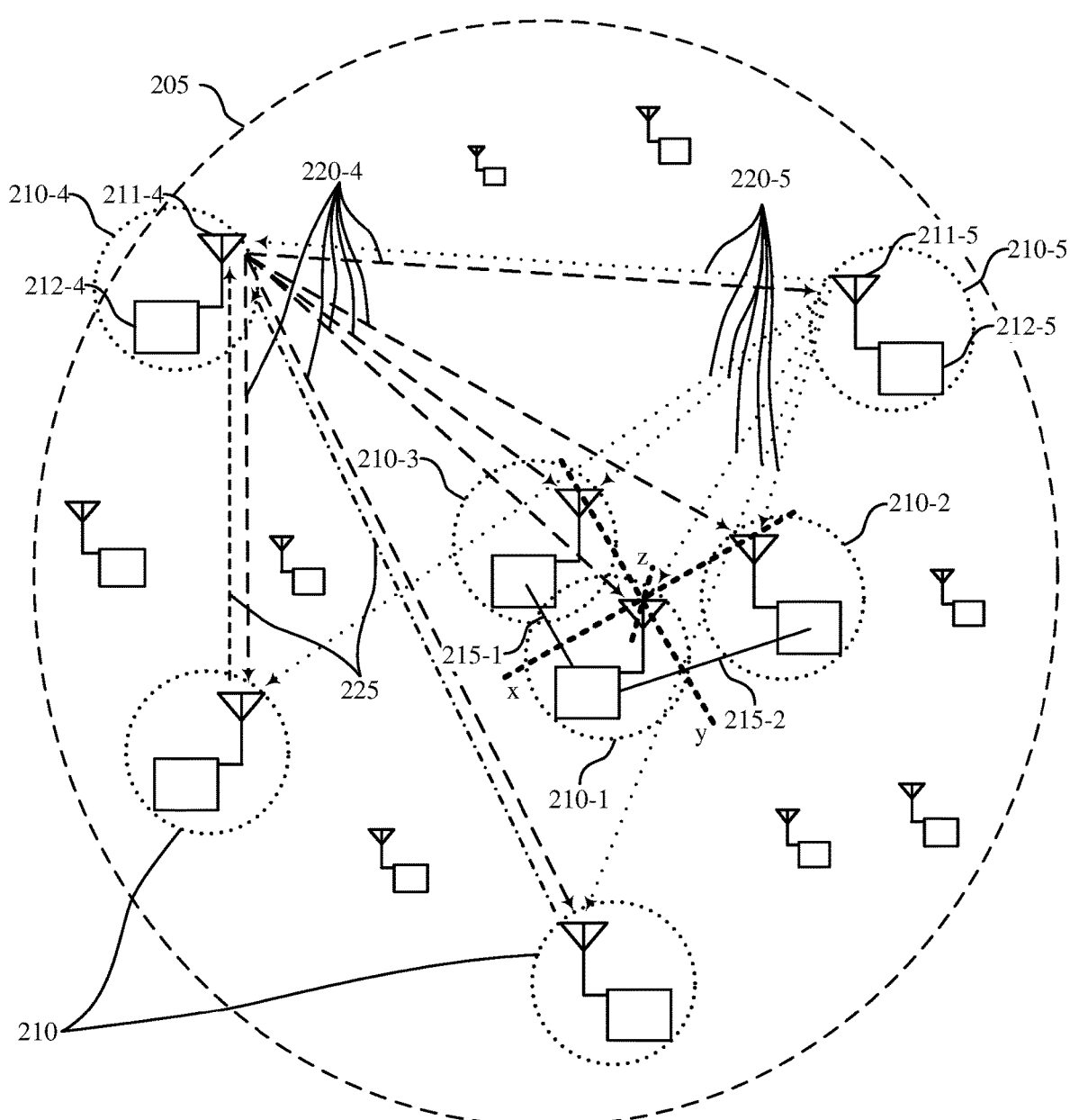
FIG. 2 shows an example of a sparse antenna array that supports sparse antenna array calibration in accordance with examples described herein.

FIG. 2 shows an example of a sparse antenna array 205 that supports sparse antenna array calibration in accordance with examples described herein.

Antenna array 205 includes antenna units 210 that may be unevenly distributed throughout antenna array 205. In some examples, a set of antenna units 210 may be designated as reference antenna units. For example, first antenna unit 210-1, second antenna unit 210-2, and third antenna unit 210-3 may be designated as reference antenna units. In some examples, a position of an antenna of first antenna unit 210-1 may be designated as the origin of antenna array 205. That is, if a three-dimensional, xyz coordinate system is used, the position of the antenna of first antenna unit 210-1 may be designated as (0, 0, 0). Each antenna unit 210 may include an antenna 211.

In some examples, the positions of the other antenna units designated as reference antenna units may be determined relative to the position of first antenna unit 210-1. For example, an antenna of second antenna unit 210-2 may be positioned a unit interval (e.g., a known distance, a distance equivalent to a wavelength or a multiple of the wavelength of a communication signal) away from the antenna of first antenna unit 210-1 in the x-direction. That is, the position of the antenna of second antenna unit 210-2 may be designated as (1, 0, 0). And the antenna of third antenna unit 210-3 may be positioned a unit interval away from the antenna of first antenna unit 210-1 in the y-direction. That is, the position of the antenna of third antenna unit 210-3 may be designated as (0, 1, 0). In some examples, the axes of the xyz coordinate system may not be fixed but instead may rotate with antenna array 205 to maintain the preceding relationship between the antennas of the reference antenna units regardless of a current orientation of antenna array 205.

In some examples, a fourth reference antenna unit has an antenna located a unit interval away from the first antenna unit 210-1 in the Z-direction. That is, the position of the antenna of the fourth reference antenna unit may be designated as (0, 0, 1). Other coordinate systems may be used to represent the positions of the antenna units 210 in antenna array 205—e.g., a polar coordinate system.

In some examples, the above configuration of the reference antenna units may be maintained using rigid connections 215 between the reference antenna units. For example, rigid connection 215-1 may connect antenna units 210-1 and 210-3, while rigid connection 215-2 may connect antenna units 210-1 and 210-2. In other examples, the above configuration of the reference antenna units may be maintained using other techniques such as station keeping (e.g., thrusters) via command and control signaling.

Additionally, or alternatively, the positions of the other reference antenna units may be determined using ground-based measurement techniques. For example, a ground station may use RADAR to determine a position of each of the reference antenna units. In some examples, the ground station may use RADAR to determine the positions of the other reference antenna units relative to the first antenna unit 210-1. In examples where mechanisms to maintain the relative positions of the reference antenna units are not used and ground-based measurement techniques are used, the positions of the reference antenna units may be configured differently than above—e.g., the position of the antenna of first antenna unit 210-1 may be at (0, 0, 0), the position of the antenna of second antenna unit 210-2 may be at (2, 0, 1), and the position of the antenna of third antenna unit 210-3 may be at (0, 1, 3).

As described herein, each of the antenna units 210 (including reference antenna units) may transmit a ranging signal 220. Each of the ranging signals 220 transmitted by the antenna units 210 may be unique—e.g., fourth antenna unit 210-4 may transmit a fourth ranging signal 220-4 from antenna 211-4 (where different components received by different antenna units 210 are shown) that is unique to fourth antenna unit 210-4, fifth antenna unit may transmit a fifth ranging signal 220-5 from antenna 211-5 (where different components received by different antenna units 210 are shown) that is unique to fifth antenna unit 210-5, and so on for the other antenna units.

In some examples, a ranging signal is transmitted using a frequency range that is unique to the transmitting antenna unit. In some examples, a ranging signal may be modulated using a modulation sequence that is unique to the transmitting antenna unit. In some examples, the modulation sequence used to modulate a ranging signal may be used to indicate an identity of the transmitting antenna unit. The modulation sequences used to transmit the ranging signals 220 may be selected to be orthogonal to one another. In some examples, a ranging signal may include information, such as a time stamp indicating when the ranging signal was transmitted, an identity of the antenna unit that transmitted the ranging signal, the latest GPS coordinates of the antenna unit that transmitted the ranging signal, etc.

The ranging signals 220 may be transmitted using out-of-band frequencies. That is, the ranging signals 220 may be transmitted using a frequency band that is different than (e.g., non-overlapping with) a frequency band used for communication signals. In some examples, the ranging signals 220 are transmitted using a frequency band that higher than the frequency band used for communication signals—e.g., so that a frequency of the ranging signals may be higher than a carrier frequency of the communication signals. Using the higher frequency band may ensure that the wavelength of the ranging signals is smaller than a wavelength of the modulated communication signals. In some examples, the ranging signals are communicated using a 60 GHz frequency band or greater.

As described herein, each antenna unit 210 (including the reference antenna units) may receive a component of each of the ranging signals transmitted from the other antenna units 210). The antenna managers 212 of the antenna units may process each of the received ranging signals 220. In some examples, the antenna managers 212 determine parameters of the received ranging signals 220. For example, the antenna managers 212 may determine the respective antenna units 210 that transmitted the received ranging signals 220.

The antenna managers 212 may also determine a time at which the ranging signals 220 are received. In some examples, a timing component provides a clock or time reference to the antenna units 210. The antenna managers 212 may also determine an angle of arrival of the received ranging signals 220. The antenna managers 212 may also determine GPS coordinates of the respective antenna units 210 (e.g., antennas 211) that transmitted the received ranging signals 220.

In some examples, each antenna unit 210 transmits a response signal (e.g., of response signals 225) in response to the received ranging signals 220. In such cases, the antenna units 210 may determine a set of parameters based on the response signals 225. For example, the antenna units 210 may determine a time at which the response signals 225 are received, an angle of arrival of the response signals 225, respective antenna units 210 that transmitted the received response signals 225, GPS coordinates of the respective antenna units 210 that transmitted the received response signals 225, or any combination thereof. Techniques that involve response signals 225 may be referred to as round-trip signaling.

In some examples, the antenna managers 212 may transmit the determined parameters to a central processing unit (e.g., a central processing unit) which may use the parameters to determine distances between each of the antenna units 210 (or antennas 211) of antenna array 205. Additionally, or alternatively, the antenna managers 212 may themselves determine distances between the antenna units 210 (or antennas 211) based on the determined parameters—e.g., by comparing a time at which a ranging signal was transmitted and a time at which the ranging signal was received divided by the speed at which the ranging signal travels (e.g., the speed of light). In some examples, the antenna managers 212 may determine the distances to the other antenna units without using a common time reference—e.g., when round-trip signaling is used based on knowing the time at which the ranging signal was transmitted and the time at which the response signal is received. The antenna units 210 may transmit the determined distances to the central processing unit. For example, antenna managers 212-4 and 212-5 of antenna units 210-4 and 210-5, respectively, may transmit determined distances from ranging signals 220-4 and 220-5 to the central processing unit.

The central processing unit may determine the distances between each of the antenna units 210 of antenna array 205 based on the received set of parameters or the distances received from the antenna units. The central processing unit may use the determined distances to determine positions of each of the antenna units 210. In some examples, the central processing unit may use the reference antenna units to determine the orientation of antenna array 205. The central processing unit may use both the determined distances, the known positions of the reference antenna units, and the orientation of the antenna array to determine the positions of each of the antenna units. Techniques used by the central processing unit to determine the positions of each of the antenna units are described in more detail herein and with respect to FIG. 3.

Figure 3:
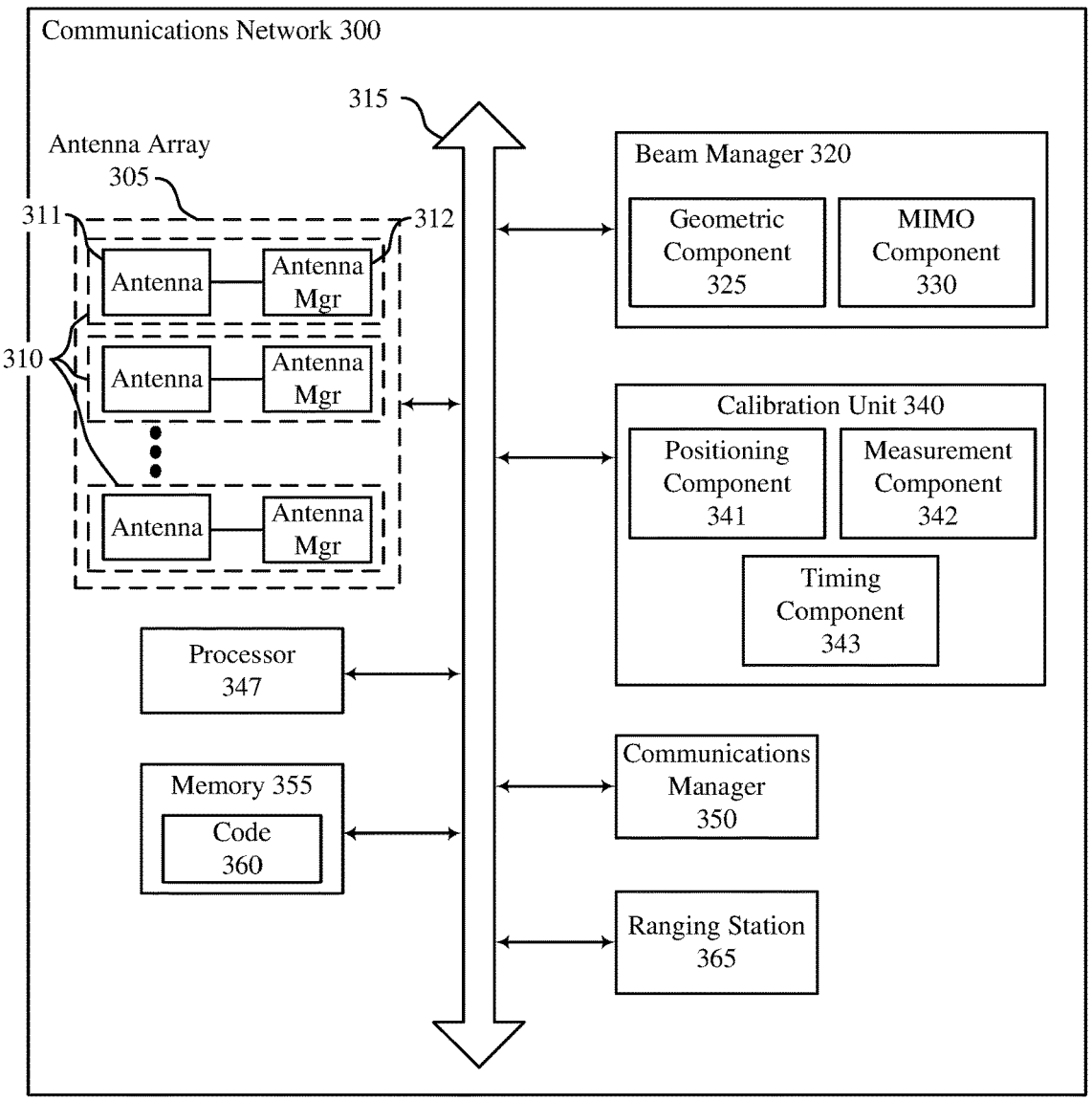
FIG. 3 shows an example of a communications network that supports sparse antenna array calibration in accordance with examples described herein.

FIG. 3 shows an example of a communications network 300 that supports sparse antenna array calibration in accordance with examples described herein.

Communications network 300 depicts a system for communicating using one or more of MIMO techniques, geometric interpretation techniques, and geometrically-informed MIMO techniques. Communications network 300 also depicts a system for calibrating antenna array 305.

Communications network 300 may include antenna array 305, bus 315, beam manager 320, calibration unit 340, processor 347, communications manager 350, and memory 355. At least a portion (e.g., all) of communications network 300 may be located within a space segment of communications network 300 (e.g., in a satellite system). In some examples, a portion of communications network 300 that is not included in the space segment may be located within a ground segment of communications network 300 (e.g., in a ground system). For example, antenna array 305, beam manager 320, calibration unit 340, processor 347, and memory 355 may be included in a space segment of communications network 300, while communications manager 350 may be included in a ground segment of communications network 300. In another example, antenna array 305 may be included in a space segment of communications network 300, while beam manager 320, calibration unit 340, processor 347, memory 355, and communications manager 350 may be included in a ground segment of communications network 300.

Antenna array 305 may be an example of the antenna array of FIGS. 1 and 2 and may include antenna units 310. The antenna units 310 may be examples of the antenna units described with reference to FIGS. 1 and 2. The spacing between the antenna units 310 may be different across antenna array 305. In some examples, one or more of the antenna units 310 may be included in an antenna subarray (an antenna subarray with inconsistent spacing) or include an antenna subarray (e.g., an antenna subarray with consistent antenna spacing) as described with reference to FIG. 1. In some examples, a distance (e.g., an average distance) between the antenna units 310 is greater than a distance associated with a wavelength of signals communicated using antenna array 305. In some examples, a distance (e.g., an average distance) between the antenna units 310 is greater than a distance associated with ten times the wavelength of the signals communicated using antenna array 305.

The antenna units 310 may include an antenna 311 and an antenna manager 312. In some examples, the antenna 311 may be a single antenna or an antenna panel that includes consistently spaced antenna elements. The antenna managers 312 may be used to manage the transmission and reception of ranging signals from a respective antenna unit 310. In some examples, a subset of the antenna units 310 (e.g., three or more of the antenna units 310) are designated as reference antenna units. In such cases, one reference antenna unit of the subset of the antenna units 310 may be designated as an origin of antenna array 305 and may be referred to as the origin reference antenna unit. That is, the origin reference antenna unit may be designated as having an xyz position of (0, 0, 0). In some examples, the reference antenna units are an affine set of points within an absolute orientation relative to a satellite including the antenna array 305.

In some examples, a position of the other reference antenna units relative to the origin reference antenna unit may be known. In some examples, the position of the other reference antenna units may be known based on an architecture of antenna array 305. For example, the antenna array 305 may be configured so that a second reference antenna has an xyz position of (1, 0, 0) and a third reference antenna has an xyz position of (0, 1, 0). In some examples, the antenna array 305 may be configured so that a fourth reference antenna has an xyz position of (0, 0, 1). In some examples, a unit of the xyz coordinates system is equivalent to a wavelength used for communication signals. Also, in some examples, the axis of the coordinate system may rotate with antenna array 305 to maintain the above coordinates regardless of the current orientation of antenna array 305. In some examples, to obtain reference antenna units that are configured with the preceding coordinates, rigid connections between the reference antenna units may be used.

In other examples, the position of the other reference antenna units relative to the origin reference antenna unit may be known based on ground-based measurement. For example, the positions of the other reference antenna units relative to the origin reference antenna unit may be determined at a ground station using RADAR or light detection and ranging (LIDAR) techniques. In some examples, the ground station may signal the positions of the reference antenna units to calibration unit 340.

Bus 315 may represent an interface over which signals may be exchanged between antenna array 305 and a central location that may be used to distribute the signals to the signal processing components of communications network 300 (e.g., beam manager 320 and calibration unit 340. Bus 315 may include a collection of wires that connect to each of the antennas. Additionally, or alternatively, bus 315 may be a wireless interface that is used to wirelessly communicate signaling between antenna array 305 and the signal processing components—e.g., in accordance with a communication protocol.

Beam manager 320 may be configured to form beams, including discovery beams, communication beams, geometric interpretation-based beams, MIMO-based beams, and the like. In some examples, beam manager 320 may be configured to form one or more discovery beams (e.g., the discovery beams that cover the discovery areas 155 of FIG. 1) within a geographic area (e.g., geographic area 150 of FIG. 1) that is covered by the antenna array 305. To form the discovery beams, native antenna patterns of sets of the antennas 311 of the antenna units 310 may be used, or may be combined with beamforming techniques, MIMO techniques, or a combination thereof.

Beam manager 320 may also be configured to form one or more communication beams (e.g., the communication beams that form the beam coverage areas 160 of FIG. 1). To form the communication beams, geometric interpretation-based beamforming techniques, MIMO techniques, or geometrically-informed MIMO techniques may be used. Beam manager 320 may include geometric component 325 and MIMO component 330.

Geometric component 325 may be configured to use a geometric relationship between a position of a terminal and a set (e.g., up to and including all) of the antenna units 310 of antenna array 305 to form small communication beams (e.g., communication beams that have a diameter that is less than ten (10) km, or less than five (5) km). In some examples, geometric component 325 may determine beam coefficients (e.g., phase shifts, amplitude components) that may be used to align in time signals detected at different antennas 311 of the antenna units 310 so that the signals may be summed together according to the spatial location of the terminal, increasing the signal strength of a transmitted signal associated with each of the detected signals. In some examples, geometric component 325 may determine a first set of beam coefficients associated with a first beam coverage area, a second set of beam coefficients associated with a second beam coverage area, and so on. Accordingly, geometric component 325 may independently determine and apply multiple sets of beam coefficients to signals received from antenna array 305, each set of beam coefficients associated with a different beam coverage area.

MIMO component 330 may be configured to use multipath signal propagation to form MIMO-based beams. In some examples, MIMO component 330 may receive channel sounding probes from a set of transmitters (e.g., terminals), where the structure of the channel sounding probes may be known to MIMO component 330 and where the channel sounding probes transmitted from different transmitters may be orthogonal to one another. MIMO component 330 may use the channel sounding probes to estimate the channel between antenna array 305 and the transmitters. Based on the estimated channel, MIMO component 330 may determine beam coefficients (e.g., amplitude and phase shifts) that may be used to reveal the spatial layers of the channel. In some examples, MIMO component 330 may determine beam coefficients that may be used to isolate signals transmitted over the spatial layers from one another—e.g., by, in each spatial layer, emphasizing the signals transmitted within the spatial layer and canceling interference from signals transmitted within other spatial layers. MIMO component 330 may determine a single set of beam coefficients that is applied to the signals detected at a set (e.g., all) of the antennas 311 of the antenna units 310 at antenna array 305. The beam coefficients may be included in an M×N matrix, where a value of M may indicate the quantity of antenna units 310 and a value of N may indicate the quantity of spatial layers, where the value of N may be less than or equal to the value of M.

Calibration unit 340 may be configured to determine a position (e.g., coordinates) of each of the antenna units 310 (or antennas 311) of antenna array 305. Calibration unit 340 may be configured to determine the distances between each of the antenna units 310 (or antennas 311) of antenna array 305. Calibration unit 340 may be configured to determine the orientation of antenna array 305. In some examples, calibration unit 340 uses the determined distances between each of the antenna units 310 and the orientation of antenna array 305 to determine the position of each of the antenna units 310 (or antennas 311). In some examples, beam manager 320 (e.g., either geometric component 325 or MIMO component 330) may use the positions of the antenna units 310 determined by calibration unit 340 to determine beam coefficients for antenna array 305 to form communication beams for communicating with one or more terminals, discovery beams, or both. Calibration unit 340 may include positioning component 341, measurement component 342, and timing component 343.

Positioning component 341 may be configured to determine positions of a set of the antenna units 310 that have been designated as reference antenna units. In some examples, positioning component 341 determines the positions of the reference antenna units based on an architecture of antenna array 305. For example, positioning component 341 may determine that a first reference antenna unit is at an origin (e.g., (0, 0, 0)) of antenna array 305, a second reference antenna unit is at a point that is a unit interval away from the origin along a first axis (e.g., (1, 0, 0)), and a third reference antenna unit is at a point that is a unit interval away from the origin along a second axis (e.g., (0, 0, 1)). In some examples, the reference antenna units may be connected to one another by way of rigid connections that maintain this geometric relationship between the reference antenna units. In some examples, the trajectories of the reference antenna units may be controlled to maintain this geometric relationship. In such cases, the coordinate system may rotate with antenna array 305 to maintain this geometric relationship between the reference antenna units.

In some examples, positioning component 341 determines the positions of the reference antenna units based on positioning coordinates broadcast by the reference antenna units—e.g., in accordance with a fixed coordinate system. In some examples, positioning component 341 determines the positions of the reference antenna units based on positioning coordinates of the reference antenna units received from a ground-based ranging station that measures the position of each of the reference antenna units.

Measurement component 342 may be configured to determine distances between each of the antenna units 310 (or antennas 311). In some examples, measurement component 342 determines the distances between each of the antenna units 310 (or antennas 311) based on sets of parameters received from the antenna units 310, where the sets of parameters may include transmission and reception timestamps. In some examples, measurement component 342 determines the distances between each of the antenna units 310 based on distances determined by and received from the antenna units 310. In some examples, measurement component 342 determines the distances between each of the antenna units 310 based on distances received from a ground-based ranging station. In some examples, the distances are expressed as multiples of a wavelength of a principal communications frequency—e.g., a lowest frequency, central frequency, or highest frequency to be covered in the communications bandwidth. For example, if the communications bandwidth ranges from 240 MHz to 380 MHz, the wavelength used as a unit of measurement may be chosen as the wavelength of 240 MHz, 310 MHz, or 380 MHz. In other examples, the distances may be expressed as multiples of a different wavelength related to the principal communications frequency (e.g., a wavelength corresponding to two times the highest frequency of the communications bandwidth).

In some examples, measurement component 342 may arrange the determined distances in matrix form, which may be referred to as a Euclidean distance matrix. For example, measurement component 342 may arrange the determined distances between a first antenna unit and the other antenna units (including itself) in a first row, the determined distances between a second antenna unit and the other antenna units (including itself) in a second row, and so on for all of the antenna units. Such a matrix may be represented as $$\begin{bmatrix} d_{1,1} & d_{1,2} & \cdots & d_{1,N} \\ d_{2,1} & d_{2,2} & \cdots & d_{2,N} \\ \vdots & \vdots & \ddots & \vdots \\ d_{N,1} & d_{N,2} & \cdots & d_{N,N} \end{bmatrix},$$

where $d_{1,1}$ represents the distance between the first antenna unit and itself; $d_{1,N}$ represents the distance between the first antenna unit and the Nth antenna unit; $d_{N,1}$ represents the distance between the Nth antenna unit and the first antenna unit; and $d_{N,N}$ represents the distance between the Nth antenna unit and the Nth antenna unit. Such a matrix may have zeros along the diagonal—e.g., because the distance between an antenna unit and itself may be equal to zero. Also, the matrix may be symmetric—that is, $d_{i,j}$ may equal $d_{j,i}$ assuming noiseless measurement. Thus, the matrix may also be represented as $$\begin{bmatrix} 0 & \cdots & d_{1,N} \\ \vdots & \ddots & \vdots \\ d_{N,1} & \cdots & 0 \end{bmatrix}.$$

An entry in the matrix, $d_{i,j}$, may be equal to $\|p_i-p_j\|^2$, which may be equivalent to $\sqrt{(p_i-p_j)\cdot(p_i-p_j)}$, which may be equivalent to $\sqrt{(x_i-x_j)^2+(y_i-y_j)^2+(z_i-z_j)^2}$.

Measurement component 342 may also be configured to determine an orientation of antenna array 305. In some examples, measurement component 342 may determine the orientation of antenna array 305 based on the reference antenna units. In some cases, measurement component 342 may determine the orientation of antenna array 305 based on receiving the positioning coordinates of the reference antenna units relative to a fixed coordinate system and determining a rotated coordinate system that provides a desired geometric relationship between the reference antenna units (e.g., (0, 0, 0); (1, 0, 0); (0, 1, 0)). Measurement component 342 may compare the fixed and rotated coordinate systems to determine an orientation of antenna array 305. In other cases, measurement component 342 may receive rotation information from the antenna units 310, where the antenna managers 312 may determine offsets between positions of the antenna units 310 and positions of a fixed coordinate system.

Positioning component 341 may be further configured to calculate the positions of the antenna units 310—e.g., based on the determined distances between each of the antenna units 310. Positioning component 341 may arrange the positions of the antenna units in matrix form. For example, a position of a first antenna unit may be represented in a first column of a matrix P, a position of a second antenna unit may be represented in a second column of the matrix, and so on. Such a matrix may be represented as $$\begin{bmatrix} x_1 & x_2 & \cdots & x_N \\ y_1 & y_2 & \cdots & y_N \\ z_1 & z_2 & \cdots & z_N \end{bmatrix}.$$

In some examples, the positions of a subset of the antenna units are known—e.g., the reference antenna units. In such cases, the matrix may be represented as $$\begin{bmatrix} 0 & 1 & 0 & x_4 & x_5 & \cdots & x_N \\ 0 & 0 & 1 & y_4 & y_5 & \cdots & y_N \\ 0 & 0 & 0 & z_4 & z_5 & \cdots & z_N \end{bmatrix}.$$

Positioning component 341 may calculate the x, y, and z coordinates corresponding to the unknown positions of the antenna units based on the Euclidean distance matrix. In some examples, the determined matrix P may be rotated relative to a fixed coordinate system by a matrix R, which may be represented as $$\begin{bmatrix} r_{1,1} & r_{1,2} & r_{1,3} \\ r_{2,1} & r_{2,2} & r_{2,3} \\ r_{3,1} & r_{3,2} & r_{3,3} \end{bmatrix}.$$

Timing component 343 may be configured to provide a common time reference to the antenna units 310. In some examples, timing component 343 is configured to transmit (e.g., periodically) one or more signals that enable the antenna units 310 to synchronize their internal clocks.

Calibration unit 340 may also include a Kalman filter. In some examples, the measurements (e.g., sets of parameters) received by measurement component 342 may be applied to the Kalman filter and used to update a model of the positions of the antenna units 310. In such cases, if the antenna units 310 are moving deterministically, the result of the Kalman filter may be used to predict positions of the antenna units 310 at a later time.

In some examples, positioning component 341 may be further configured to calculate the orientation of antennas (e.g., antennas 111) of the antenna units 310, for example using signal strength measurements of the ranging signals transmitted by an antenna unit 310 received at multiple other antenna units 310, and a known radiation pattern of the antenna 111 of the antenna unit 310. For example, an orientation of an antenna 111 may be determined by comparing relative signal strength measurements of ranging signals, taking into account the relative distances determined between the antenna units 310.

Communications manager 350 may be configured to process beam signals received from beam manager 320. Communications manager 350 may decode data symbols included in the beam signals. In some examples, communications manager 350 may configure different modes at beam manager 320. For example, communications manager 350 may configure a first mode at beam manager 320 that is used for discovering terminals in a geographic area. While the first mode is configured, beam manager 320 may use beamforming and/or MIMO techniques to form discovery areas. Communications manager 350 may also configure a second mode at beam manager 320 that is used for communication with terminals in the geographic area using small beams. While the second mode is configured, beam manager 320 may use geometric interpretation to form beam coverage areas for communicating with discovered terminals.

Processor 347 may include an intelligent hardware device (e.g., a general-purpose processor, a digital signal processor (DSP), a central processing unit (CPU), a microcontroller, an application-specific integrated circuit ( ), a field-programmable gate array (FPGA), a programmable logic device, a discrete gate or transistor logic component, a discrete hardware component, or any combination thereof). The processor 347 may be configured to execute computer-readable instructions stored in a memory (e.g., memory 355) to cause the communications network 300 to perform various functions (e.g., functions or tasks supporting sparse antenna array calibration). For example, the communications network 300 or a component of the communications network 300 may include a processor 347 and memory 355 coupled to the processor 347 that are configured to perform various functions described herein.

The memory 355 may include random access memory (RAM) and/or read-only memory (ROM). The memory 355 may store code that is computer-readable and computer-executable. The code may include instructions that, when executed by the processor 347, cause the communications network 300 to perform various functions described herein. The code 360 may be stored in a non-transitory computer-readable medium such as system memory or another type of memory. In some cases, the code 360 may not be directly executable by the processor 347 but may cause a computer (e.g., when compiled and executed) to perform functions described herein. In some cases, the memory 355 may contain, among other things, a basic I/O system (BIOS) which may control basic hardware or software operation such as the interaction with peripheral components or devices.

In some examples, beam manager 320, calibration unit 340, communications manager 350, or various combinations or components thereof, may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, beam manager 320, calibration unit 340, communications manager 350, or various combinations or components thereof, may be implemented in code 360 (e.g., as communications management software or firmware), executed by processor 347. If implemented in code 360 executed by processor 347, the functions of beam manager 320, calibration unit 340, communications manager 350, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Ranging station 365 may be configured to determine geometric information of antenna array 305. In some examples, ranging station 365 may be configured to determine a position of a set of antenna units 310 that have been designated as reference antenna units. Ranging station 365 may also be configured to determine a distance between each of the antenna units 310. Ranging station 365 may be ground-based or satellite based.

Figure 4:
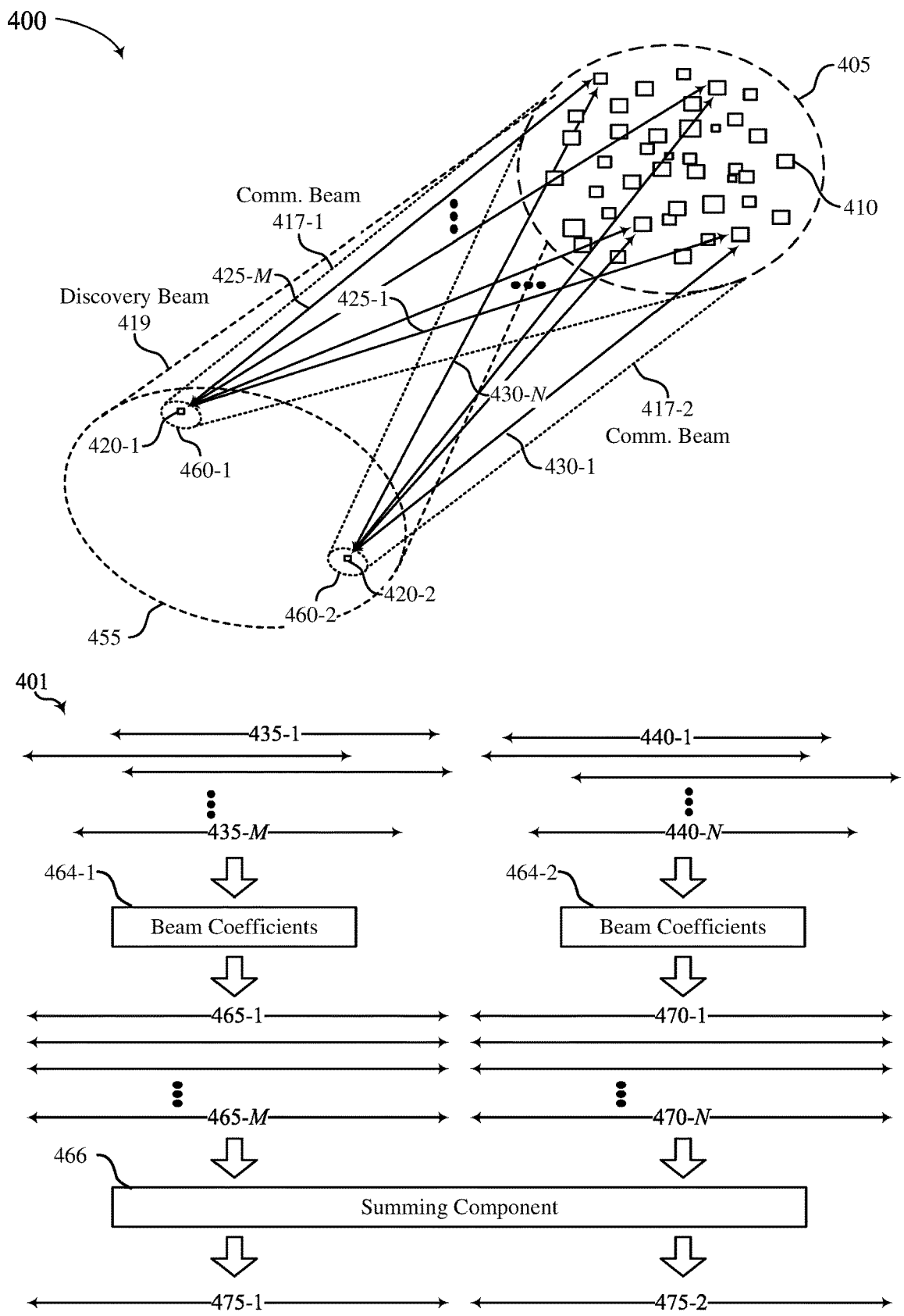
FIGS. 4 and 5 show examples of communications subsystems that support sparse antenna array calibration in accordance with examples described herein.

FIG. 4 shows an example of a communications subsystem 400 that supports sparse antenna array calibration in accordance with examples described herein. Communications subsystem 400 depicts communications between antenna array 405 and terminals 420 that are processed using geometric relationships between the antenna units 410 of antenna array 405 and the terminals 420. In some examples, a first set of signals 425 (signals 425-1 to 425-M) are transmitted between first terminal 420-1 and antenna array 405, and a second set of signals 430 (e.g., signals 430-1 to 430-N) are transmitted between second terminal 420-2 and antenna array 405. In some examples, the first set of signals 425 may be associated with a single signal (e.g., a preamble or data signal) transmitted from first terminal 420-1 to antenna array 405, where the first set of signals 425 may be components (e.g., multipath components) of the signal transmitted from first terminal 420-1. In other examples, the first set of signals 425 may be associated with a single signal (e.g., a preamble response or data signal) obtained at antenna array 405 for transmission to first terminal 420-1, where the first set of signals 425 may be components (e.g., elements) of the signal transmitted from antenna array 405. Similarly, the second set of signals 430 may be associated with a single signal (e.g., a preamble or data signal) transmitted from second terminal 420-2 to antenna array 405 or a single signal (e.g., a preamble response or data signal) obtained at antenna array 405 for transmission to second terminal 420-2.

In some examples, a first set of the antenna units 410 and first beam coefficients are used to form discovery beam 419 having discovery area 455. Signals received at antenna array 405 using the first set of the antenna units 410 and the first beam coefficients may be analyzed to determine whether a preamble indicating the presence of a terminal is included in the signals. In some examples, the presence of first terminal 420-1 is detected based on first terminal 420-1 transmitting a preamble, where the first set of signals 425 may be signal components of the preamble transmission. The preamble may include a repeating waveform. In some examples, the waveform may be modulated with a spreading code before transmission or may include encoded data to increase a difficulty associated with spoofing the preamble. The preamble may also include positioning information—e.g., in a second part of the preamble.

In some examples, a position of first terminal 420-1 may be determined based on positioning information included in the preamble. Additionally, or alternatively, the position of first terminal 420-1 may be determined based on dithering a beam coverage area around discovery area 455 after detecting the presence of first terminal 420-1. The position of first terminal 420-1 may be determined based on a signal quality associated with first beam coverage area 460-1 satisfying a threshold, being higher than signal qualities associated with other beam coverage areas covered by the dithering operation, or both. The presence and position of second terminal 420-2 may similarly be detected based on a preamble transmitted from second terminal 420-2, where the second set of signals 430 may be signal components of the preamble transmission. Similarly, the position of second terminal 420-2 may be determined based on dithering a beam coverage area 460-2 around discovery area 455 after detecting the presence of second terminal 420-2.

Second beam coefficients may be determined for first terminal 420-1 based on the position of first terminal 420-1. The second beam coefficients may also be determined based on a position of the antenna units 410 relative to first terminal 420-1, where the position of the antenna units 410 may be determined as described above. In some cases, the second beam coefficients may also be determined based on determined orientations of the antenna units 410, where the orientations of the antenna units may be determined as described above. The second beam coefficients, along with a second set of the antenna units 410, may be used in the formation of first communication beam 417-1 having first beam coverage area 460-1. The second beam coefficients may be used to apply timing shifts (e.g., phase shifts) or amplitude weighting to signals detected at different antennas of the second set of the antenna units 410, such that signals transmitted within first beam coverage area 460-1 are distinguishable from signals transmitted within adjacent beam coverage areas. In some examples, the second beam coefficients may be represented using an $M_1 \times 1$ vector, where $M_1$ may represent the quantity of antennas (e.g., 100 antennas, 1000 antennas, etc.) of the second set of the antenna units 410. In some cases, the $M_1 \times 1$ vector may include coefficients for all of antenna units 410, where some coefficients may be zero coefficients (e.g., the second set of antenna units 410 that contribute to the first communication beam 417-1 may be a subset of the antenna units 410).

Third beam coefficients may similarly be determined for second terminal 420-2. In some examples, the third beam coefficients may be represented using an $M_2 \times 1$ vector, where $M_2$ may represent the quantity of antennas (e.g., 100 antennas, 1000 antennas, etc.) of a third set of the antenna units 410. In some examples, the third set of the antenna units 410 and the second set of the antenna units 410 are overlapping (e.g., partially or completely).

In some examples, the first set of the antenna units 410 associated with discovery beam 419 may detect the first set of signals 425 within discovery area 460 and the second beam coefficients used to form first communication beam 417-1 may be determined. Based on the determining, the second beam coefficients may be applied to a subsequent set of detected signals (e.g., corresponding to a subsequent data signal transmitted by first terminal 420-1) that is output by the second set of the antenna units 410 associated with first communication beam 417-1. In some examples, the second set of the antenna units 410 includes most (e.g., greater than 50%, 60%, 70%, 80%, or 90%) of the antenna units 410 at antenna array 405. In some cases, the second set of antenna units 410 may include a portion (or all) of the first set of antenna units 410 associated with discovery beam 419, where the second set of antenna units 410 may include a larger quantity of the antenna units 410 than the first set of antenna units 410.

The first set of antenna units 410 associated with discovery beam 419 may also detect the second set of signals 430 within discovery area 460 and the third beam coefficients used to form second communication beam 417-2 may be determined. Based on the determining, the third beam coefficients may be applied to a subsequent set of detected signals (corresponding to a subsequent data signal transmitted by second terminal 420-2) that is output by the third set of the antenna units 410 associated with second communication beam 417-2. The third set of antenna units 410 may be overlapping with the second set of antenna units 410—e.g., may include a portion of or be the same as the second set of antenna units 410. The second set of antenna units 410 may also include most (e.g., greater than 50%, 60%, 70%, 80%, or 90%) of the antenna units 410 at antenna array 405.

Signal diagram 401 depicts a first set of element signals 435 (e.g., element signals 435-1 to 435-M) detected at the second set of antenna units 410 associated with first communication beam 417-1 and a second set of element signals 440 (e.g., element signals 440-1 to 440-N) detected at the third set of antenna units 410 associated with second communication beam 417-2. Signal diagram 401 also depicts time delays associated with when the first set of element signals 435 and second set of element signals 440 are detected at respective antennas. The first set of element signals 435 may correspond to the first set of signals 425, and the second set of element signals 440 may correspond to the second set of signals 430. In some examples, the first set of element signals 435 and the first set of signals 425 may be associated with a data signal transmitted from first terminal 420-1. And the second set of element signals 440 and the second set of signals 430 may be associated with a data signal transmitted from second terminal 420-2.

Signal diagram 401 also depicts a result of applying first beam coefficients 464-1 (which may correspond to the second beam coefficients used to form first communication beam 417-1) to the first set of element signals 435 to obtain resulting element signals 465 (e.g., element signals 465-1 to 465-M). In some examples, each beam coefficient of first beam coefficients 464-1 may be applied to a respective antenna of the second set of the antenna units 410. Each beam coefficient of first beam coefficients 464-1 may be used to apply a time delay (e.g., a phase shift) or an amplitude weight, or both, to a signal received at a respective antenna element such that the resulting element signals 465 are aligned in time and can be combined (e.g., summed via summing component 466) with one another to form first beam signal 475-1 for first communication beam 417-1, where a signal-to-noise ratio (SNR) value of first beam signal 475-1 may be proportional to the quantity of element signals 465. In some examples, summing component 466 may include separate summing components that are used to sum the element signals obtained for respective communication beams.

Second beam coefficients 464-2 (which may correspond to the third beam coefficients used to form second communication beam 417-2) may similarly be applied to the second set of element signals 440 and the resulting element signals 470 (e.g., element signals 470-1 to 470-N) may be combined (e.g., summed via summing component 466) to obtain second beam signal 475-2 for second communication beam 417-2. Accordingly, the beam coefficients used to form the communication beams 417 may be independently determined and applied to signals received at antenna units 410.

In some examples, the transmission of the associated data signal from first terminal 420-1 and the associated data signal from second terminal 420-2 may overlap (e.g., partially or fully) with one another in time. In such cases, the first set of element signals 435 and the second set of element signals 440 may be superimposed, forming a composite signal. Also, in such cases, first beam coefficients 464-1 may be applied to the composite signals to obtain resulting element signals 465 and second beam coefficients 464-2 may be applied to the composite signal to obtain resulting element signals 470. In such cases, the undesired signals in the composite signals may result in noise in the resulting beam signal 475 and may approach being canceled for a large number of elements signals.

In some examples, the following equation may be used for determining beam signals received from multiple communication beams 417:

$$\text{CohSum}(t) = \Sigma_{i=1}^{N} A[\![i]\!] \text{Signal}[2\pi f_0(t - (t_{prop}[\![i]\!]|_{phySRF} - t_{prop}[\![i]\!]|_{EstSRF})) + \emptyset[(t - (t_{prop}[\![i]\!]|_{phySRF} - t_{prop}[\![i]\!]|_{EstSRF}))]],$$

where $A[\![i]\!]$ Signal corresponds to the signal received at the ith antenna of a set of antennas, $f_0$ is the carrier frequency of the signal, t is the current time, $t_{prop}[\![i]\!]|_{phySRF}$ is the time at which the signal is received at the ith antenna, $t_{prop}[\![i]\!]|_{EstSRF}$ is a quantized estimate of the time delay between the signal received at the ith antenna and the earliest signal received at the set of antennas, and $\emptyset$ is the phase of the signal. The time delay between the signal recited at the ith antenna and the earliest signal received at the set of antennas represents the delay spread across the array at each ith antenna. Subtracting the individual delay may bring all signal samples into alignment—e.g., as if they were all co-located at the "earliest signal" arrival location.

Figure 5:
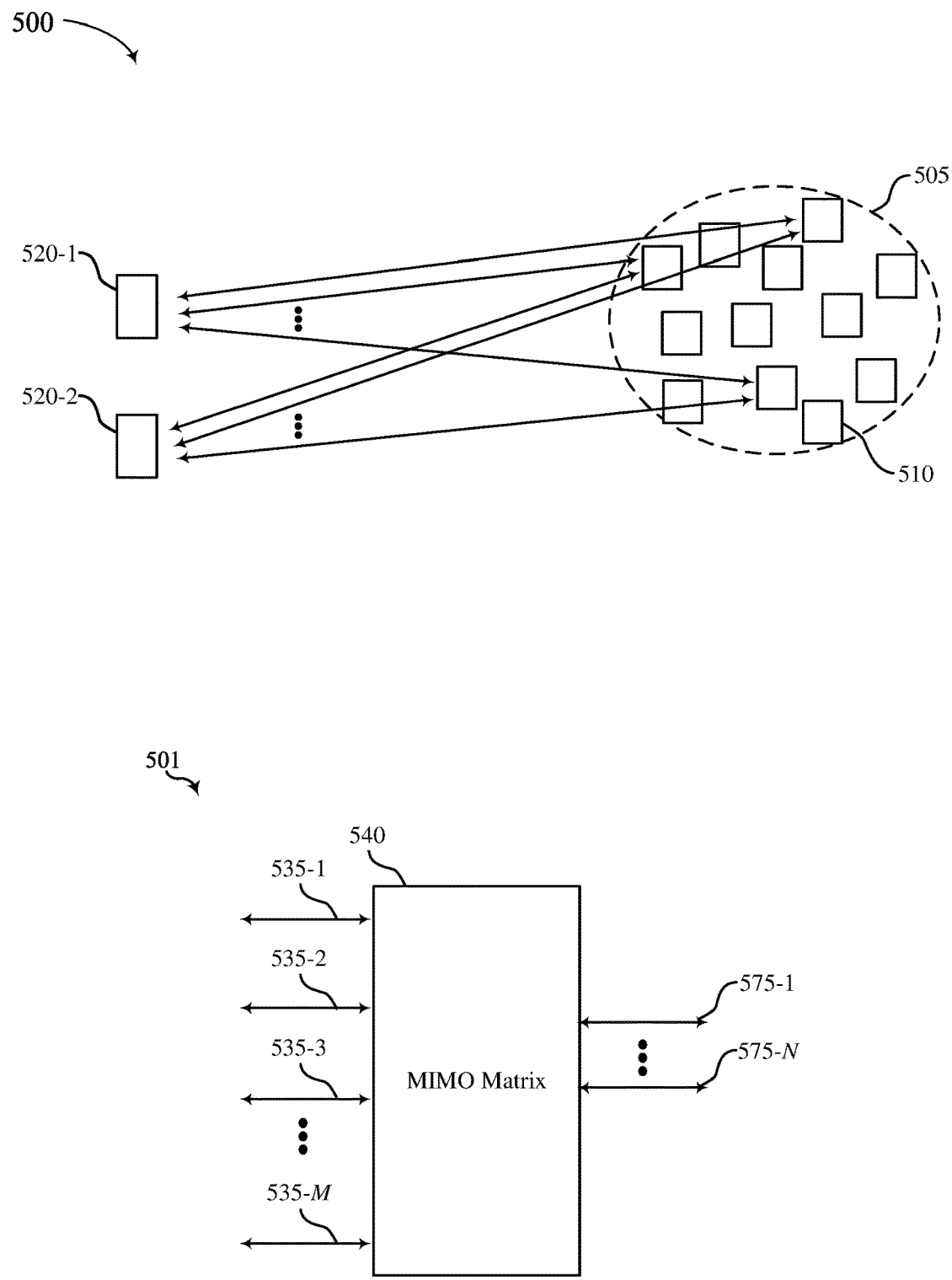

FIG. 5 shows an example of a communications subsystem 500 that supports sparse antenna array calibration in accordance with examples described herein. Communications subsystem 500 depicts communications between antenna array 505 and terminals 520 that are processing using MIMO processing or geometrically-informed MIMO processing. In some examples, first terminal 520-1 is an example of first terminal 520-1 of FIG. 5, and second terminal 520-2 is an example of second terminal 520-2 of FIG. 5.

The communication paths between the terminals 520 and antenna array 505 may be referred to as a channel. The channel may be composed of multiple spatial layers, where the multiple antenna units 510 of antenna array 505 (along with a set of beam coefficients) may be used to expose the spatial layers of the channel. In some examples, the set of beam coefficients (which may also be referred to as MIMO coefficients) are selected to expose a first spatial layer of the channel that encompasses first terminal 520-1 (which may also be referred to as a communication beam or MIMO beam) and a second spatial layer of the channel that encompasses second terminal 520-2.

In some examples, the beam coefficients are determined based on channel sounding probes transmitted from the terminals 520. The channel sounding probes may have signal patterns that are known to the communications network and that can be used to adapt the beam coefficients to ensure that the spatial layers are focused on respective terminals (or groups of terminals). The channel sounding probes may also be orthogonal to one another. Estimation techniques, such as maximum ratio combining (MRC), minimum mean square error (MMSE), zero forcing, successive interference cancellation, maximum likelihood estimation, or neural network MIMO detection techniques, may be used to estimate the channel between antenna array 505 and the terminals 520, as well as to determine the beam coefficients. Because the beam coefficients are formed using channel sounding probes received from multiple terminals, the resulting beam coefficients may be dependent on channel sounding probes transmitted in different spatial layers. That is, the beam coefficients may be determined to decrease interference from the channel sounding probes on each other and changes to one beam coefficient may result in changes to other beam coefficients. Accordingly, the beam coefficients may be included in a single MIMO matrix (e.g., a M×N matrix, where M may represent the quantity of antenna units 510 and N may represent the quantity of spatial streams), where the elements of the matrix may be dependent on one another.

In some examples, operations for determining the beam coefficients use high levels of processing and are highly complex. The amount of processing and complexity may increase as the quantity of antennas increases and as the quantity of spatial streams increases. In some examples, geometric relationships between terminals 520 and antenna units 510 may be used to simplify the operations for determining the beam coefficients—e.g., by constraining the channel matrix, reducing the set of possible beam coefficients, or both. In some examples, the channel sounding probes may experience less scattering based on the relative positions of the terminals 520 and antenna array 505. Accordingly, the channel estimated using the channel sounding probes may be constrained, which may reduce a complexity associated with determining the beam coefficients.

The geometric relationships between terminals 520 and antenna units 510 may enable the set of possible beam coefficients to be reduced for one or more of the following reasons—the position of the antennas in space may reduce the amount of scattering and multipath components that are taken into consideration in a terrestrial application; the position of the antennas in space may reduce the angles from which the signals transmitted from terminals 520 may arrive; the time delays at the different antenna units 510 may be utilized to determine spatial information that facilitates determining the beam coefficients, etc.

Signal diagram 501 may depict a first set of element signals 535 (e.g., element signals 535-1, 535-2, 535-3 to 535-M) received at antenna array 505, where each element signal 535 may be received at a respective antenna—e.g., first element signal 535-1 may correspond to a first antenna of the antenna units 510. Each element signal 535 may receive signal components related to signals transmitted from first terminal 520-1 and second terminal 520-2 (and, in some examples, from other terminals), including direct path and multipath signals.

MIMO matrix 540 may be applied to the element signals 535, where the elements of MIMO matrix 540 may be previously determined using channel sounding probes transmitted from a set of terminals. After MIMO matrix 540 is applied to element signals 535, a set of beam signals 575 (e.g., beam signals 575-1 to 575-N) may be output, where the beam signals 575 may be associated with respective spatial layers of the channel that are exposed by MIMO matrix 540.

Figure 6:
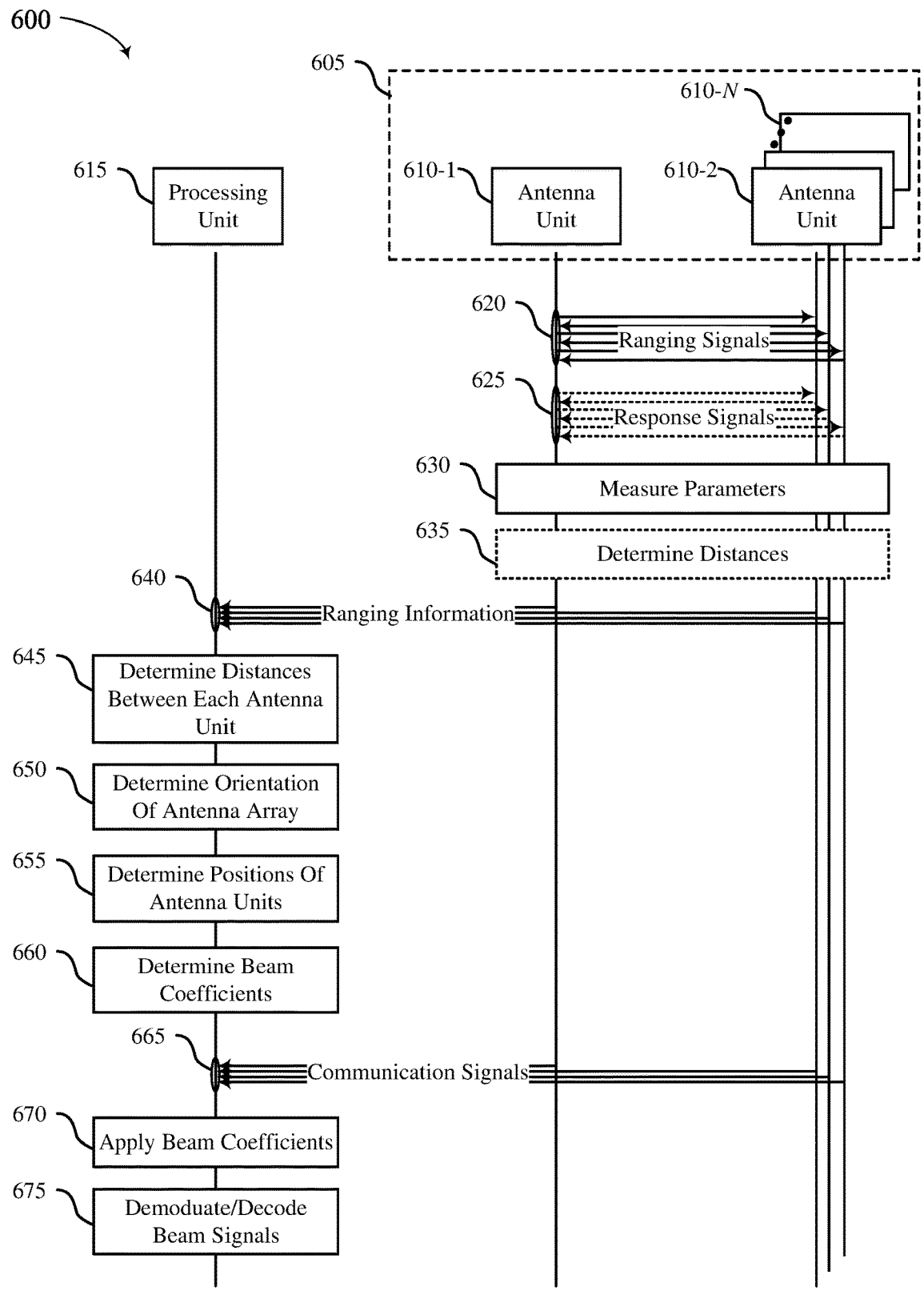
FIGS. 6 and 7 show examples of sets of operations for sparse antenna array calibration in accordance with examples described herein.

FIG. 6 shows an example set of operations for sparse antenna array calibration in accordance with examples described herein. Process flow 600 may be performed by processing unit 615 and antenna units 610 (e.g., antenna units 610-1, 610-2 to 610-N) of antenna array 605. Processing unit 615 may include a calibration unit and a beam manager as described with reference to FIG. 3. Antenna array 605 and antenna units 610 may be respective examples of an antenna array and antenna units as described with reference to FIGS. 1 through 5.

In some examples, process flow 600 illustrates an exemplary sequence of operations performed to support sparse antenna array calibration. For example, process flow 600 depicts operations for discovering terminals and forming small communication beams using a sparse antenna array. One or more of the operations described in process flow 600 may be performed earlier or later in the process, omitted, replaced, supplemented, or combined with another operation. Also, additional operations described herein that are not included in process flow 600 may be included.

At 620, the antenna units 610 may each broadcast ranging signals. Each of the ranging signals may be unique to the transmitting antenna unit. For example, each ranging signal may be modulated using a modulation sequence that is unique to the transmitting antenna unit. In some examples, the ranging signals may include information, such as an identity of the transmitting antenna unit, a time at which the ranging signal was transmitted, GPS coordinates of the transmitting antenna unit, or any combination thereof. In some examples, the antenna units 610 may each broadcast the ranging signals at the same time. In other examples, the broadcasting of the ranging signals may be staggered—e.g., within a time window.

At 625, the antenna units 610 may each transmit response signals in response to receiving a set of ranging signals. In some examples, the transmitting antenna units 610 may use the same modulation sequence used to transmit a broadcast ranging signal to transmit the response signals. Each of the response signals may be transmitted a fixed or known time after receiving the respective ranging signals. In some examples, the response signals may include information, such as an identity of the responding antenna unit, a time at which the response signal was transmitted, GPS coordinates of the responding antenna unit, or any combination thereof.

At 630, the antenna units 610 may measure parameters for the ranging signals, response signals, or both. Based on receiving the ranging signals transmitted by the other antenna units, each of the antenna units 610 may determine parameters for each of the received ranging signals. For example, second antenna unit 610-2 may determine parameters (e.g., timing information, angle of arrival, received signal strength, etc.) for a ranging signal received from first antenna unit 610-1, and vice versa. Based on receiving response signals from the other antenna units, the receiving antenna units may determine parameters for the response signals. For example, first antenna unit 610-1 may determine parameters (e.g., timing information, received signal strength, angle of arrival, etc.) for a response signal received from second antenna unit 610-2 in response to the ranging signal transmitted by first antenna unit 610-1, and vice versa. In some examples, the antenna units 610 determine to which of the antenna units 610 the measured parameters belong based on identifying information indicated by the corresponding ranging signal or response signal. For example, the antenna units 610 may decode identifying information from the corresponding ranging signal or response signal. Additionally, or alternatively, the antenna units 610 may determine the identity of the corresponding antenna units based on an index of a modulation sequence used for the ranging signal—e.g., where each of the antenna units 610 may be assigned to use a respective modulation sequence of a set of modulation sequences.

At 635, each of the antenna units 610 may determine distances between itself and the other antenna units—e.g., based on the measured parameters, information included in the ranging signals, information included in the response signals. In some examples, the antenna units 610 may use time stamps received in a ranging signal to determine the distances. For example, second antenna unit 610-2 may determine a distance between itself and first antenna unit 610-1 based on a timestamp included in the ranging signal transmitted from first antenna unit 610-1, a time at which the ranging signal was received at second antenna unit 610-2, and speed at which the ranging signal propagates. In examples where each of the ranging signals are transmitted at a same time, second antenna unit 610-2 may determine the distance between itself and first antenna unit 610-1 based on the common transmission time, a time at which the ranging signal transmitted by the first antenna unit 610-1 was received at second antenna unit 610-2, and the speed at which the ranging signal propagates. In some examples, the antenna units 610 may use GPS coordinates received in a ranging signal to roughly determine the distances.

At 640, the antenna units 610 may transmit ranging information to processing unit 615. In some examples, the ranging information includes the parameters measured by the antenna units 610 for each of the other antenna units. In some examples, the ranging information includes the distances determined by each of the antenna units 610 between themselves and the other antenna units.

At 645, processing unit 615 may determine the distances between each of the antenna units 610—e.g., based on the received parameters, the received distances, or a combination thereof. Processing unit 615 may generate a Euclidean distance matrix based on the distances, as described herein and with reference to FIG. 3, where the Euclidean distance matrix may express the distances between each of the antenna units 610.

At 650, processing unit 615 may determine an orientation of antenna array 605. In some examples, a subset of antenna units 610 may be designated as reference antenna units with an origin of antenna array 605 being positioned at one of the reference antenna units, and processing unit 615 may use the reference antenna units to determine the orientation of antenna array 605, as described herein and with reference to FIGS. 2 and 3.

At 655, processing unit 615 may determine the positions of the antenna units 610 based on the distances determined between each of the antenna units 610 (e.g., the Euclidean distance matrix). In some examples, processing unit 615 may also use the orientation of antenna array 605 to determine the positions of the antenna units 610. In some examples, processing unit 615 may determine orientations of each of the antenna units 610 relative to the orientation of the antenna array 605 based on the distances determined for each of the antenna units, measured signal strength of the ranging signals or response signals, and known antenna radiation patterns of the antenna units 610.

At 660, processing unit 615 may determine beam coefficients for antenna array 605. The beam coefficients may be used in combination with antenna array 605 to form one or more communication beams having beam coverage areas encompassing one or more terminals. The beam coefficients may be determined based on the determined orientation of antenna array 605, determined positions of the antenna units 610, and/or the determined orientations of the antenna units 610 relative to the orientation of the antenna array 605.

At 665, processing unit 615 may receive communication signals from the one or more terminals via antenna units 610.

At 670, processing unit 615 may apply the determined beam coefficients to the received communication signals to obtain one or more beam signals transmitted from one or more terminals. For example, antenna units 610 may transmit representations of the received communications signals to processing unit 615, which may apply the determined beam coefficients to obtain the one or more beam signals. In some examples, the beam coefficients are applied at antenna units 610 to obtain components of one or more beam signals, and the antenna units 610 transmit the components of the one or more beam signals to processing unit 615. Processing unit 615 may combine (e.g., sum) the components of the one or more beam signals to obtain one or more beams signals.

At 675, processing unit 615 may demodulate the beam signals and decode the resulting data signals.

Figure 7:
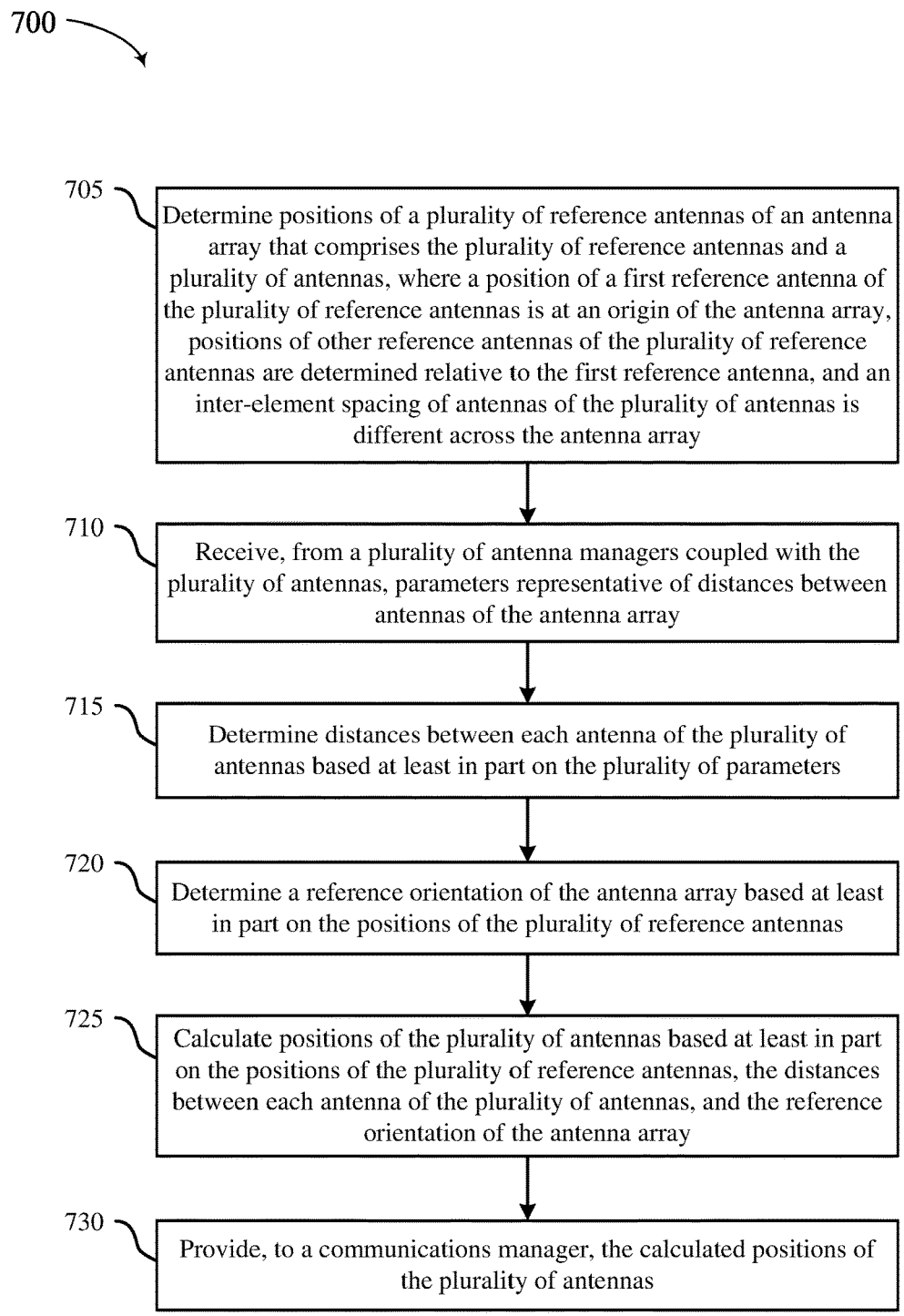

FIG. 7 shows an example set of operations for sparse antenna array calibration in accordance with examples described herein. Method 700 may be performed by components of a communication network, such as an antenna array, a ground system, a calibration unit, or a combination thereof, which may be examples of a communications network (or components thereof) described with reference to FIGS. 1 and 3. In some examples, a communications network may execute a set of instructions to control the functional elements of the communications network to perform the described functions. Additionally, or alternatively, the communications network may perform aspects of the described functions using special-purpose hardware.

At 705, method 700 may include determining positions of a plurality of reference antennas of an antenna array that comprises the plurality of reference antennas and a plurality of antennas, where a position of a first reference antenna of the plurality of reference antennas is at an origin of the antenna array, positions of other reference antennas of the plurality of reference antennas are determined relative to the first reference antenna, and an inter-element spacing of antennas of the plurality of antennas is different across the antenna array. The operations of 705 may be performed in accordance with examples as disclosed herein. In some examples, aspects of the operations of 705 may be performed by a positioning component, as described herein and with reference to FIG. 3.

At 710, method 700 may include receiving, from a plurality of antenna managers coupled with the plurality of antennas, parameters representative of distances between antennas of the antenna array. The operations of 710 may be performed in accordance with examples as disclosed herein. In some examples, aspects of the operations of 710 may be performed by a positioning component, as described as described herein and with reference to FIG. 3.

At 715, method 700 may include determining distances between each antenna of the plurality of antennas based at least in part on the plurality of parameters. The operations of 715 may be performed in accordance with examples as disclosed herein. In some examples, aspects of the operations of 715 may be performed by a positioning component, as described as described herein and with reference to FIG. 3.

At 720, method 700 may include determining a reference orientation of the antenna array based at least in part on the positions of the plurality of reference antennas. The operations of 720 may be performed in accordance with examples as disclosed herein. In some examples, aspects of the operations of 720 may be performed by a positioning component, as described as described herein and with reference to FIG. 3.

At 725, method 700 may include calculating positions of the plurality of antennas based at least in part on the positions of the plurality of reference antennas, the distances between each antenna of the plurality of antennas, and the reference orientation of the antenna array. The operations of 725 may be performed in accordance with examples as disclosed herein. In some examples, aspects of the operations of 725 may be performed by a measurement component, as described as described herein and with reference to FIG. 3.

At 730, method 700 may include providing, to a communications manager, the calculated positions of the plurality of antennas. The operations of 730 may be performed in accordance with examples as disclosed herein. In some examples, aspects of the operations of 730 may be performed by a measurement component, as described as described herein and with reference to FIG. 3.

In some examples, an apparatus as described herein may perform a method or methods, such as the method 700. The apparatus may include, features, circuitry, logic, means, or instructions (e.g., an apparatus including memory and a processor for executing instructions stored in the memory, a non-transitory computer-readable medium storing code comprising instructions executable by a processor) for determining positions of a plurality of reference antennas of an antenna array that includes the plurality of reference antennas and a plurality of antennas, where a position of a first reference antenna of the plurality of reference antennas is at an origin of the antenna array, positions of other reference antennas of the plurality of reference antennas are determined relative to the first reference antenna, and an inter-element spacing of antennas of the plurality of antennas is different across the antenna array; receiving, from a plurality of antenna managers coupled with the plurality of antennas, parameters representative of distances between antennas of the antenna array; determining distances between each antenna of the plurality of antennas based at least in part on the plurality of parameters; determining a reference orientation of the antenna array based at least in part on the positions of the plurality of reference antennas; calculating positions of the plurality of antennas based at least in part on the positions of the plurality of reference antennas, the distances between each antenna of the plurality of antennas, and the reference orientation of the antenna array; and providing, to a communications manager, the calculated positions of the plurality of antennas.

In some examples, to calculate the positions of the plurality of antennas, the apparatus may include, features, circuitry, logic, means, or instructions for calculating, based at least in part on the distances between each antenna of the plurality of antennas, the calculated positions of the plurality of antennas relative to the origin of the antenna array and in accordance with the reference orientation.

In some examples, the set of parameters includes indications of the distances between each antenna of the plurality of antennas, and determining the distances between each of antenna of the plurality of antennas is based at least in part on the indications of the distances.

In some examples, the positions of the plurality of reference antennas are determined based at least in part on a plurality of rigid connections between the plurality of reference antennas.

In some examples, the apparatus may include, features, circuitry, logic, means, or instructions for receiving, from a ground-based measurement station, measured positions of the plurality of reference antennas, where the positions of the plurality of reference antennas are determined based at least in part on the measured distances.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

In some examples, a system as described herein may perform a method or methods, such as the method 700. The system may include an antenna array comprising a plurality of antennas, where an inter-element spacing of antennas of the plurality of antennas is different across the antenna array; a plurality of antenna managers, where each antenna manager of the plurality of antenna managers is coupled with a respective antenna of the plurality of antennas and configured to: transmit a respective ranging signal from the respective antenna of the plurality of antennas, receive a respective set of ranging signals from other antennas of the plurality of antennas, and measure, based at least in part on receiving the respective set of ranging signals, respective parameters representative of distances between the respective antenna and the other antennas; a calibration unit configured to: determine positions of a plurality of reference antennas, where a position of a first reference antenna of the plurality of reference antennas is at an origin of the antenna array, and where positions of other reference antennas of the plurality of reference antennas are determined relative to the first reference antenna, the plurality of antennas comprising the plurality of reference antennas, determine distances between each antenna of the plurality of antennas based at least in part on the parameters measured by the plurality of antenna managers, determine a reference orientation of the antenna array based at least in part on the positions of the plurality of reference antennas, and calculate positions of the plurality of antennas based at least in part on the positions of the plurality of reference antennas, the distances between each antenna of the plurality of antennas, and the reference orientation of the antenna array; and a communications manager configured to communicate with a terminal according to beam coefficients determined for the antenna array based at least in part on the calculated positions of the plurality of antennas, the beam coefficients used to form a plurality of beams.

In some examples of the system, the system includes a beam manager configured to determine, for the antenna array, the beam coefficients based at least in part on the calculated positions of the plurality of antennas.

In some examples of the system, to calculate the positions of the plurality of antennas, the calibration unit is further configured to calculate, based at least in part on the distances between each antenna of the plurality of antennas, the calculated positions of the plurality of antennas relative to the origin of the antenna array and in accordance with the reference orientation.

In some examples of the system, the plurality of antenna managers are configured to transmit, to the calibration unit, the parameters measured by the plurality of antenna managers, and the calibration unit is configured to determine the distances between each antenna of the plurality of antennas based at least in part on receiving the parameters measured by the plurality of antenna managers.

In some examples of the system, each antenna manager of the plurality of antenna managers is configured to determine the distances between the respective antenna and the other antennas of the plurality of antennas based at least in part on measuring the respective set of parameters, and transmit, to the calibration unit, indications of the distances between the respective antenna and the other antennas; and the calibration unit is configured to determine the distances between each antenna of the plurality of antennas based at least in part on the indications of the respective distances received from the plurality of antenna managers.

In some examples of the system, the respective ranging signals transmitted from the plurality of antennas are unique.

In some examples of the system, a ranging signal transmitted by an antenna manager of the plurality of antenna managers includes an identifier of the antenna manager, a timestamp of when the ranging signal was transmitted, positioning coordinates of the antenna manager, or any combination thereof.

In some examples of the system, the respective ranging signals are transmitted in a first band that is non-overlapping with a second band used by the communications manager to communicate with terminals.

In some examples of the system, a first frequency band used to transmit the respective ranging signals is higher than a second frequency band used to transmit communication signals.

In some examples of the system, a wavelength of the ranging signals is less than a wavelength of a communication signal.

In some examples of the system, a bandwidth of the ranging signals is greater than a center frequency of the second frequency band.

In some examples, the system includes a timing component configured to provide a common time reference to the plurality of antenna managers.

In some examples of the system, a second antenna manager of the plurality of antenna managers is configured to determine a distance between a first antenna coupled with a first antenna manager of the plurality of antenna managers and a second antenna coupled with the second antenna manager based at least in part on a ranging signal received from the first antenna.

In some examples of the system, the second antenna manager is further configured to determine the distance between the first antenna and the second antenna based at least in part on a timestamp signaled by the ranging signal and a time at which the ranging signal is received.

In some examples of the system, a first antenna manager of the plurality of antenna managers is configured to: determine a distance between a first antenna coupled with the first antenna manager and a second antenna coupled with a second antenna manager of the plurality of antenna managers based at least in part on a ranging signal transmitted by the first antenna manager and a response signal received from the second antenna in response to the ranging signal.

In some examples of the system, the first antenna manager is configured to determine a difference between a first time at which the ranging signal is transmitted by the first antennas manager and a second time at which the response signal is received from the second antenna, where the distance between the first antenna and the second antenna is based at least in part on the difference.

In some examples of the system, an antenna manager of the plurality of antenna managers is configured to: determine, over a plurality of time periods, a plurality of distances between the respective antenna and a second antenna of the plurality of antennas based at least in part on a plurality of parameters measured across the plurality of time periods; and obtain a distance between the respective antenna and the second antenna based at least in part on a function of the plurality of distances.

In some examples of the system, each antenna manager of the plurality of antenna managers is configured to: obtain, from the respective set of ranging signals, a set of GPS coordinates associated with the other antennas of the plurality of antennas; and determine a coarse estimate of a distance between a coupled antenna and the other antennas of the plurality of antennas based at least in part on the set of GPS coordinates.

In some examples, of the system, the antenna array includes a plurality of rigid connections between the plurality of reference antennas, where the calibration unit is configured to determine the positions of the plurality of reference antennas based at least in part on the plurality of rigid connections.

In some examples, the system includes a ground-based measurement station configured to measure the positions of the plurality of reference antennas to obtain measured positions and to signal the measured positions of the plurality of reference antennas to the calibration unit, where the calibration unit is configured to receive the signal comprising the measured positions of the plurality of reference antennas and to determine the positions of the plurality of reference antennas based at least in part on the signal.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system for communications, comprising:
  an antenna array comprising a plurality of antennas, wherein an inter-element spacing of antennas of the plurality of antennas is different across the antenna array;
  a plurality of antenna managers, wherein each antenna manager of the plurality of antenna managers is coupled with a respective antenna of the plurality of antennas and configured to:
    transmit a respective ranging signal from the respective antenna of the plurality of antennas,
    receive a respective set of ranging signals from other antennas of the plurality of antennas, and
    measure, based at least in part on receiving the respective set of ranging signals, respective parameters representative of distances between the respective antenna and the other antennas;
  a calibration unit configured to:
    determine positions of a plurality of reference antennas, wherein a position of a first reference antenna of the plurality of reference antennas is at an origin of the antenna array, and wherein positions of other reference antennas of the plurality of reference antennas are determined relative to the first reference antenna, the plurality of antennas comprising the plurality of reference antennas,
    determine distances between each antenna of the plurality of antennas based at least in part on the respective parameters measured by the plurality of antenna managers,
    determine a reference orientation of the antenna array based at least in part on the positions of the plurality of reference antennas, and
    calculate positions of the plurality of antennas based at least in part on the positions of the plurality of reference antennas, the distances between each antenna of the plurality of antennas, and the reference orientation of the antenna array; and
  a communications manager configured to communicate with a terminal according to beam coefficients determined for the antenna array based at least in part on the calculated positions of the plurality of antennas, the beam coefficients used to form a plurality of beams.

2. The system of claim 1, further comprising:
  a beam manager configured to determine, for the antenna array, the beam coefficients based at least in part on the calculated positions of the plurality of antennas.

3. The system of claim 1, wherein, to calculate the calculated positions of the plurality of antennas, the calibration unit is further configured to:
  calculate, based at least in part on the distances between each antenna of the plurality of antennas, the calculated positions of the plurality of antennas relative to the origin of the antenna array and in accordance with the reference orientation.

4. The system of claim 1, wherein:
the plurality of antenna managers are configured to transmit, to the calibration unit, the respective parameters measured by the plurality of antenna managers, and
the calibration unit is configured to determine the distances between each antenna of the plurality of antennas based at least in part on receiving the respective parameters measured by the plurality of antenna managers.

5. The system of claim 1, wherein:
each antenna manager of the plurality of antenna managers is configured to:
 determine the distances between the respective antenna and the other antennas of the plurality of antennas based at least in part on measuring the respective parameters, and
 transmit, to the calibration unit, indications of the distances between the respective antenna and the other antennas; and
the calibration unit is configured to determine the distances between each antenna of the plurality of antennas based at least in part on the indications of the distances between the respective antenna and the other antennas received from the plurality of antenna managers.

6. The system of claim 1, wherein the respective ranging signals transmitted from the plurality of antennas are unique.

7. The system of claim 1, wherein a ranging signal transmitted by an antenna manager of the plurality of antenna managers comprises an identifier of the antenna manager, a timestamp of when the ranging signal was transmitted, positioning coordinates of the antenna manager, or any combination thereof.

8. The system of claim 1, wherein the respective ranging signals are transmitted in a first band that is non-overlapping with a second band used by the communications manager to communicate with terminals.

9. The system of claim 1, wherein a first frequency band used to transmit the respective ranging signals is higher than a second frequency band used to transmit communication signals.

10. The system of claim 9, wherein a wavelength of the ranging signals is less than a wavelength of a communication signal.

11. The system of claim 9, wherein a bandwidth of the ranging signals is greater than a center frequency of the second frequency band.

12. The system of claim 1, further comprising:
a timing component configured to provide a common time reference to the plurality of antenna managers.

13. The system of claim 1, wherein a second antenna manager of the plurality of antenna managers is configured to:
determine a distance between a first antenna coupled with a first antenna manager of the plurality of antenna managers and a second antenna coupled with the second antenna manager based at least in part on a ranging signal received from the first antenna.

14. The system of claim 13, wherein the second antenna manager is further configured to:
determine the distance between the first antenna and the second antenna based at least in part on a timestamp signaled by the ranging signal and a time at which the ranging signal is received.

15. The system of claim 1, wherein a first antenna manager of the plurality of antenna managers is configured to:
determine a distance between a first antenna coupled with the first antenna manager and a second antenna coupled with a second antenna manager of the plurality of antenna managers based at least in part on a ranging signal transmitted by the first antenna manager and a response signal received from the second antenna in response to the ranging signal.

16. The system of claim 15, wherein the first antenna manager is configured to:
determine a difference between a first time at which the ranging signal is transmitted by the first antenna manager and a second time at which the response signal is received from the second antenna, wherein the distance between the first antenna and the second antenna is based at least in part on the difference.

17. The system of claim 1, wherein an antenna manager of the plurality of antenna managers is configured to:
determine, over a plurality of time periods, a plurality of distances between the respective antenna and a second antenna of the plurality of antennas based at least in part on a plurality of parameters measured across the plurality of time periods; and
obtain a distance between the respective antenna and the second antenna based at least in part on a function of the plurality of distances.

18. The system of claim 1, wherein each antenna manager of the plurality of antenna managers is configured to:
obtain, from the respective set of ranging signals, a set of GPS coordinates associated with the other antennas of the plurality of antennas; and
determine a coarse estimate of a distance between a coupled antenna and the other antennas of the plurality of antennas based at least in part on the set of GPS coordinates.

19. The system of claim 1, wherein the antenna array comprises:
a plurality of rigid connections between the plurality of reference antennas, wherein the calibration unit is configured to determine the positions of the plurality of reference antennas based at least in part on the plurality of rigid connections.

20. The system of claim 1, further comprising:
a ground-based measurement station configured to measure the positions of the plurality of reference antennas to obtain measured positions and to send a signal comprising the measured positions of the plurality of reference antennas to the calibration unit,
wherein the calibration unit is configured to receive the signal comprising the measured positions of the plurality of reference antennas and to determine the positions of the plurality of reference antennas based at least in part on the signal.

21. A method for communications, comprising:
determining positions of a plurality of reference antennas of an antenna array that comprises the plurality of reference antennas and a plurality of antennas, wherein:
a position of a first reference antenna of the plurality of reference antennas is at an origin of the antenna array,
positions of other reference antennas of the plurality of reference antennas are determined relative to the first reference antenna, and
an inter-element spacing of antennas of the plurality of antennas is different across the antenna array;

receiving, from a plurality of antenna managers coupled with the plurality of antennas, parameters representative of distances between antennas of the antenna array;

determining distances between each antenna of the plurality of antennas based at least in part on the parameters received from the plurality of antenna managers;

determining a reference orientation of the antenna array based at least in part on the positions of the plurality of reference antennas;

calculating positions of the plurality of antennas based at least in part on the positions of the plurality of reference antennas, the distances between each antenna of the plurality of antennas, and the reference orientation of the antenna array; and providing, to a communications manager, the calculated positions of the plurality of antennas.

22. The method of claim 21, wherein calculating the positions of the plurality of antennas comprises:

calculating, based at least in part on the distances between each antenna of the plurality of antennas, the calculated positions of the plurality of antennas relative to the origin of the antenna array and in accordance with the reference orientation.

23. The method of claim 21, wherein:

the parameters comprise indications of the distances between each antenna of the plurality of antennas, and determining the distances between each antenna of the plurality of antennas is based at least in part on the indications of the distances.

24. The method of claim 21, wherein the positions of the plurality of reference antennas are determined based at least in part on a plurality of rigid connections between the plurality of reference antennas.

25. The method of claim 21, further comprising:

receiving, from a ground-based measurement station, measured positions of the plurality of reference antennas, wherein the positions of the plurality of reference antennas are determined based at least in part on the measured positions.

* * * * *